United States Patent
Chu et al.

(10) Patent No.: US 11,627,610 B1
(45) Date of Patent: Apr. 11, 2023

(54) WIFI BACKOFF TIMER

(71) Applicant: MARVELL ASIA PTE, LTD., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 22 days.

(21) Appl. No.: 17/178,767

(22) Filed: Feb. 18, 2021

Related U.S. Application Data

(63) Continuation of application No. 16/406,898, filed on May 8, 2019, now Pat. No. 10,939,476.

(60) Provisional application No. 62/668,699, filed on May 8, 2018.

(51) Int. Cl.
 *H04W 74/08* (2009.01)
 *H04W 76/18* (2018.01)
 *H04W 76/15* (2018.01)

(52) U.S. Cl.
 CPC ......... *H04W 74/085* (2013.01); *H04W 76/15* (2018.02); *H04W 76/18* (2018.02)

(58) Field of Classification Search
 None
 See application file for complete search history.

(56) References Cited

U.S. PATENT DOCUMENTS

| | | |
|---|---|---|
| 8,773,969 B1 | 7/2014 | Zhang et al. |
| 8,787,385 B2 | 7/2014 | Liu et al. |
| 9,876,614 B1 | 1/2018 | Sun et al. |
| 10,257,806 B2 | 4/2019 | Chu et al. |
| 10,349,413 B2 | 7/2019 | Zhang et al. |
| 2004/0264561 A1 | 12/2004 | Alexander et al. |

(Continued)

FOREIGN PATENT DOCUMENTS

| | | |
|---|---|---|
| EP | 2028809 A2 | 2/2009 |
| EP | 2999252 A1 | 3/2016 |

(Continued)

OTHER PUBLICATIONS

Seok et al., "Enhanced Multi-band/Multi-channel Operation," IEEE draft doc. IEEE 802.11-19/076641, vo. 802.11 EHT; 802.11be, No. 1; 13 pages (May 14, 2019).

(Continued)

*Primary Examiner* — Anh Ngoc M Nguyen

(57) ABSTRACT

A communication device maintains a first backoff timer that corresponds to a first channel segment in a first radio frequency (RF) band, and maintains a second backoff timer that corresponds to a second channel segment in a second RF band. The first backoff timer is for determining when the communication device can transmit via the first channel segment, and the second backoff timer is for determining when the communication device can transmit via the second channel segment. In response to the first backoff timer expiring, the communication device waits to transmit via the first channel segment until the second backoff timer expires. After waiting to transmit via the first channel segment and in response to the second backoff timer expiring, the communication device transmits via the first channel segment beginning at a start time, and transmits via the second channel segment beginning at the start time.

19 Claims, 12 Drawing Sheets

(56) References Cited

U.S. PATENT DOCUMENTS

| | | | |
|---|---|---|---|
| 2007/0047461 A1* | 3/2007 | Seo | H04L 1/206 370/252 |
| 2010/0208712 A1 | 8/2010 | Wax et al. | |
| 2011/0096747 A1* | 4/2011 | Seok | H04W 72/04 370/329 |
| 2011/0249659 A1 | 10/2011 | Fontaine et al. | |
| 2012/0014336 A1* | 1/2012 | Seok | H04L 27/2605 370/329 |
| 2015/0098541 A1 | 4/2015 | Ben-Bassat | |
| 2015/0146653 A1 | 5/2015 | Zhang et al. | |
| 2015/0271002 A1 | 9/2015 | Oh et al. | |
| 2016/0057657 A1 | 2/2016 | Seok | |
| 2016/0157261 A1 | 6/2016 | Xiang | |
| 2016/0212748 A1 | 7/2016 | Yang et al. | |
| 2016/0241315 A1 | 8/2016 | Kwon | |
| 2016/0249381 A1 | 8/2016 | Choi et al. | |
| 2016/0302200 A1 | 10/2016 | Yang et al. | |
| 2016/0323820 A1 | 11/2016 | Wong et al. | |
| 2017/0048048 A1 | 2/2017 | Seok | |
| 2017/0111853 A1 | 4/2017 | Hegde et al. | |
| 2017/0149547 A1 | 5/2017 | Kim et al. | |
| 2017/0181136 A1 | 6/2017 | Bharadwaj et al. | |
| 2017/0188336 A1 | 6/2017 | Ahn et al. | |
| 2017/0289933 A1 | 10/2017 | Segev et al. | |
| 2017/0295571 A1 | 10/2017 | Chu et al. | |
| 2017/0311204 A1 | 10/2017 | Cariou et al. | |
| 2017/0325178 A1 | 11/2017 | Verma et al. | |
| 2017/0366329 A1 | 12/2017 | Cao et al. | |
| 2018/0115403 A1 | 4/2018 | Sakai et al. | |
| 2018/0160429 A1 | 6/2018 | Seok | |
| 2018/0205441 A1 | 7/2018 | Asterjadhi et al. | |
| 2018/0302858 A1 | 10/2018 | Son et al. | |
| 2019/0090278 A1 | 3/2019 | Chu et al. | |
| 2019/0123863 A1 | 4/2019 | Zhang et al. | |
| 2019/0124652 A1 | 4/2019 | Kim et al. | |
| 2019/0182714 A1 | 6/2019 | Chu et al. | |
| 2019/0182863 A1 | 6/2019 | Chu et al. | |
| 2019/0190752 A1 | 6/2019 | Chen et al. | |
| 2019/0238259 A1 | 8/2019 | Huang et al. | |
| 2019/0349930 A1 | 11/2019 | Chu et al. | |
| 2020/0037324 A1 | 1/2020 | Chu et al. | |
| 2020/0107393 A1 | 4/2020 | Chu et al. | |
| 2020/0304266 A1 | 9/2020 | Chu et al. | |
| 2020/0404680 A1 | 12/2020 | Chu et al. | |

FOREIGN PATENT DOCUMENTS

| | | |
|---|---|---|
| GB | 2501898 A | 11/2013 |
| WO | WO-2006/000955 A1 | 1/2006 |
| WO | WO-2012/026779 A2 | 3/2012 |
| WO | WO-2015/099803 A1 | 7/2015 |
| WO | WO-2017/026937 A1 | 2/2017 |
| WO | WO-2017/111567 A2 | 6/2017 |

OTHER PUBLICATIONS

Seok et al., "EHT Multi-link Operation," IEEE draft doc. IEEE 802.11-19/0731r0, vo. 802.11 EHT; 802.11be; 17 pages (May 15, 2019).

Choi et al., "View on EHT Objectives and Technologies," IEEE draft doc. IEEE 802.11-18/1171r0, 13 pages (Jul. 8, 2018).

Chu et al., "Multiple Band Operation Discussion," IEEE draft doc. IEEE 802.11-19/0821r0, vol. 802.11 EHT; 802.11be; 7 pages (May 14, 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE P802.11ax™M/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

Fischer et al., "IEEE P802.11—Wireless LANs—Disallowed Sub channels," doc. no. IEEE 802.11-18/0496r3, *The Institute of Electrical and Electronics Engineers*, pp. 1-11 (May 2018).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

IEEE Std 802.11ac™—2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

U.S. Appl. No. 16/406,898, Chu et al., entitled "WIFI Backoff Timer," filed May 8, 2019.

Von Mulert, et al., "Security threats and solutions in MANETs: A case study using AODV and SAODV," J. of Network and Computer Applications, vol. 35, pp. 1249-1259, Feb. 17, 2012.

* cited by examiner

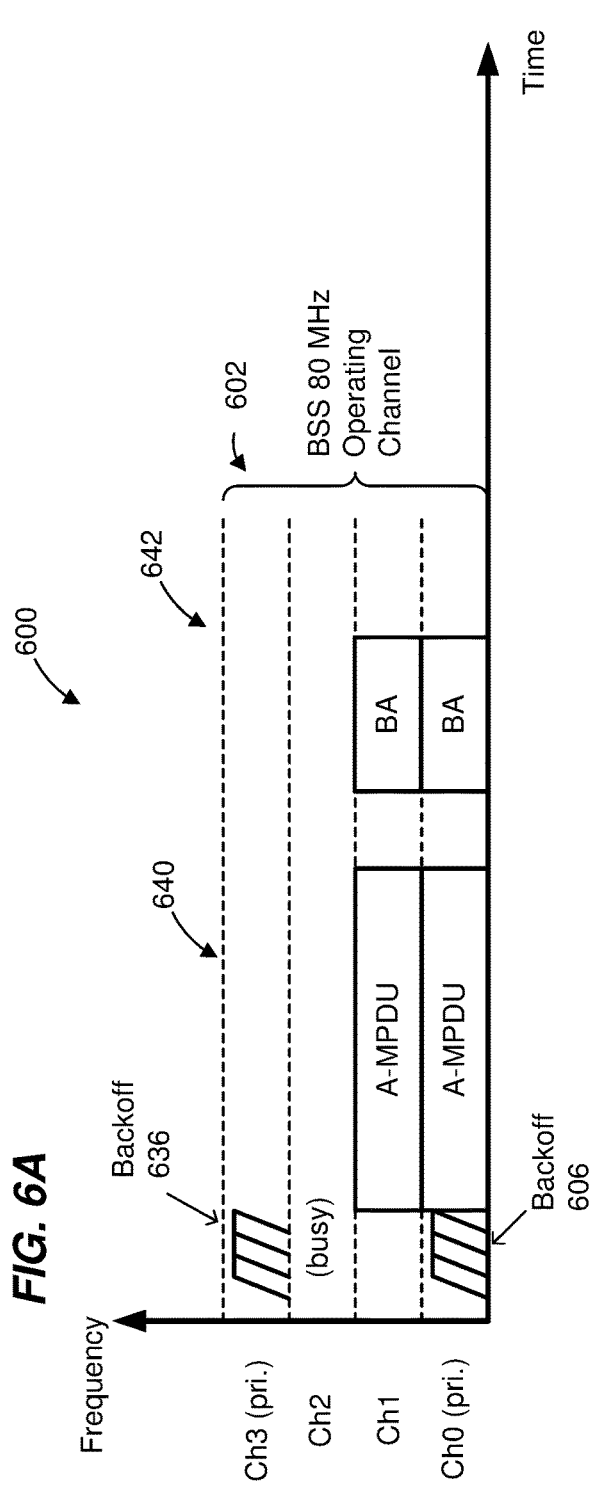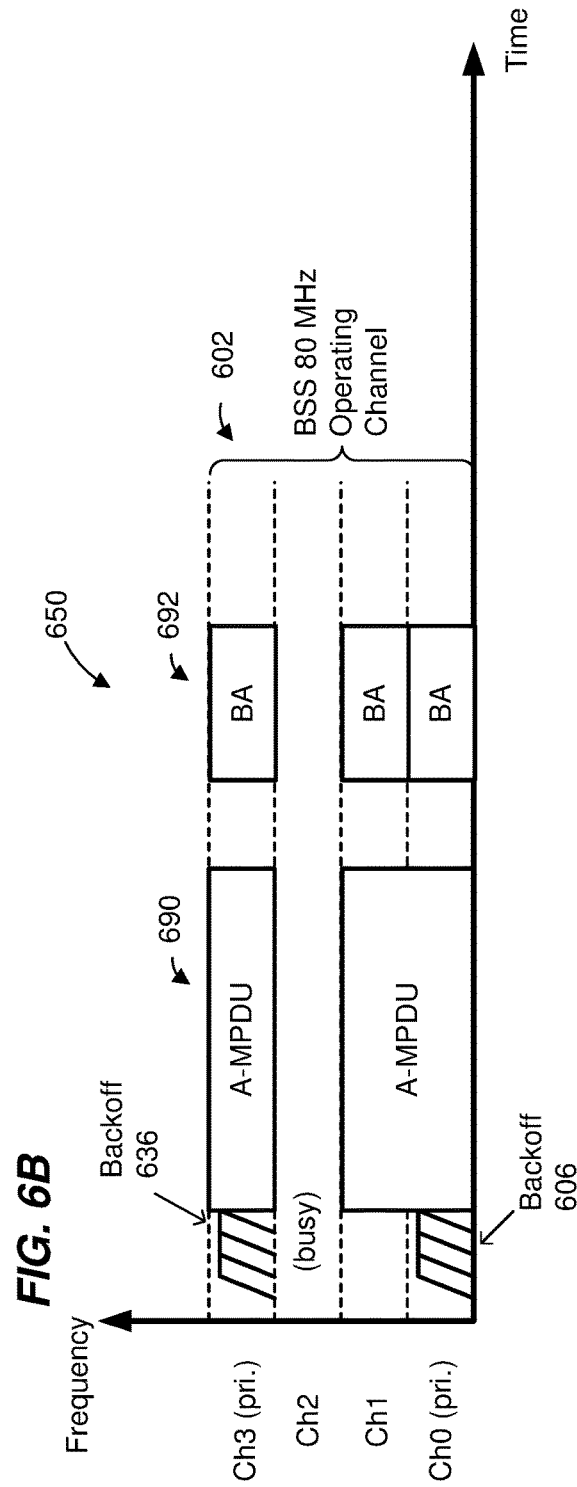

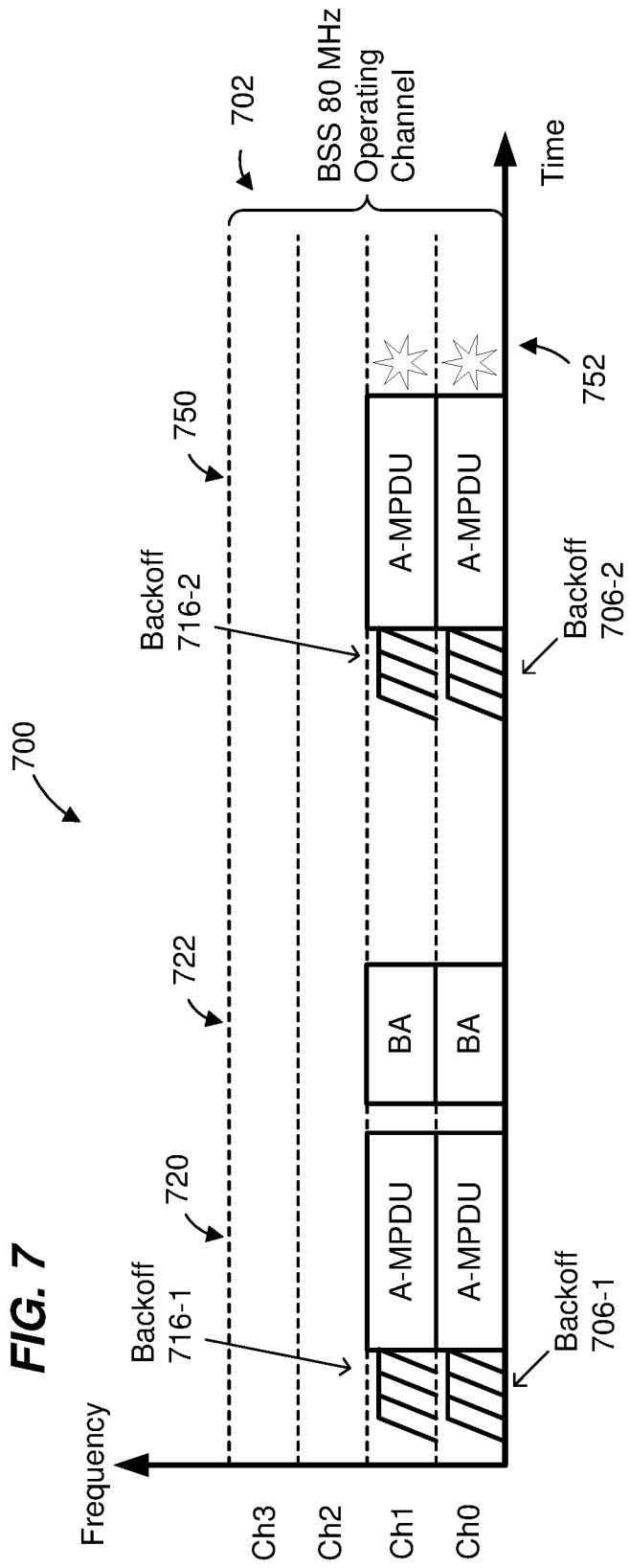

WIFI BACKOFF TIMER

CROSS REFERENCES TO RELATED APPLICATIONS

This application is a continuation of U.S. patent application Ser. No. 16/406,898 (now U.S. Pat. No. 10,939,476), entitled "WIFI Backoff Timer," filed on May 8, 2019, which claims the benefit of U.S. Provisional Patent Application No. 62/668,699, entitled "Backoff with Switched Primary Channel or Multiple Primary 20 MHz Channels," filed on May 8, 2018. Both of the applications referenced above are hereby incorporated herein by reference in their entireties.

Additionally, this application is related to U.S. patent application Ser. No. 16/162,113 (now U.S. Pat. No. 10,805,051), entitled "WiFi Channel Aggregation" and filed on Oct. 16, 2018, and U.S. application Ser. No. 16/179,634 (now U.S. Pat. No. 10,834,639), entitled "WiFi Operation with Channel Aggregation" and filed on Nov. 2, 2018, which are hereby incorporated by reference in their entireties.

FIELD OF TECHNOLOGY

The present disclosure relates generally to wireless communication systems, and more particularly to media access channel (MAC) support for data transmission and reception over multiple communication channels.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

WLAN communication devices often utilize backoff timers to reduce a likelihood that a first WLAN communication device attempts to transmit on a WLAN communication channel while a second WLAN communication device is already transmitting on the same WLAN communication channel. For example, the first WLAN communication device sets a network allocation vector (NAV) based on a NAV indication or duration indication in a physical layer (PHY) protocol data unit (PPDU) that is transmitted by the second WLAN communication device. In some scenarios, the first WLAN communication device does not receive the PPDU and cannot reliably set the NAV for the WLAN communication channel to avoid interference with the second WLAN communication device.

SUMMARY

In an embodiment, a method is for simultaneously transmitting via a plurality of channel segments that includes i) a first channel segment in a first radio frequency (RF) band, and ii) a second channel segment in a second RF band. The method includes: maintaining, at a communication device, a first backoff timer that corresponds to the first channel segment, the first backoff timer for determining when the communication device can transmit via the first channel segment; maintaining, at the communication device, a second backoff timer that corresponds to the second channel segment, the second backoff timer for determining when the communication device can transmit via the second channel segment; in response to the first backoff timer expiring, waiting, by the communication device, to transmit via the first channel segment until the second backoff timer expires; and after waiting to transmit via the first channel segment and in response to the second backoff timer expiring: transmitting, by the communication device, via the first channel segment beginning at a start time, and transmitting, by the communication device, via the second channel segment beginning at the start time.

In another embodiment, an apparatus comprises: a wireless network interface device that is configured to communicate simultaneously via a plurality of channel segments having i) a first channel segment in a first RF band, and ii) a second channel segment in a second RF band. The wireless network interface device comprises: one or more integrated circuit (IC) devices; a first backoff timer that corresponds to the first channel segment, the first backoff timer implemented on the one or more IC devices; and a second backoff timer that corresponds to the second channel segment, the second backoff timer implemented on the one or more IC devices. The one or more IC devices are configured to: maintain the first backoff timer to determine when the communication device can transmit via the first channel segment; maintain the second backoff timer to determine when the communication device can transmit via the second channel segment; in response to the first backoff timer expiring, control the wireless network interface device to wait to transmit via the first channel segment until the second backoff timer expires; and after controlling the wireless network interface device to wait to transmit via the first channel segment and in response to the second backoff timer expiring: control the wireless network interface device to transmit via the first channel segment beginning at a start time, and control the wireless network interface device to transmit via the second channel segment beginning at the start time.

BRIEF DESCRIPTION OF THE DRAWINGS

FIG. 6A and FIG. 6B are example timing diagrams for a WLAN communication device configured to use separate FIG. 7 is an example timing diagrams for a WLAN communication device configured to use separate backoff timers in multiple component channels of a WLAN communication channel, in an embodiment.

DETAILED DESCRIPTION

Figure 1:
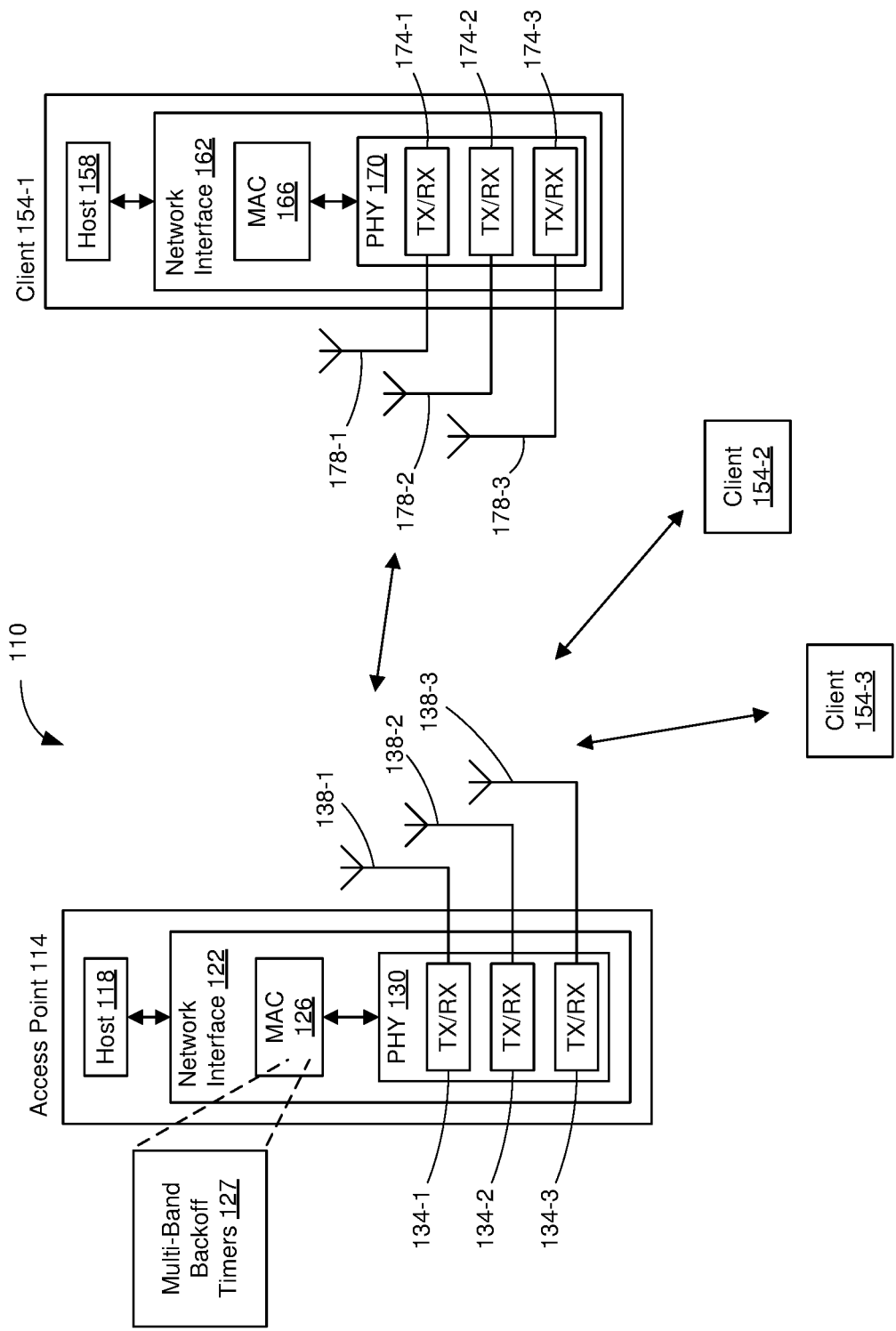
FIG. 1 is a block diagram of an example wireless local area network (WLAN), according to an embodiment.

Multi-channel communication techniques described below are discussed merely for explanatory purposes in the context of wireless local area networks (WLANs) that utilize protocols which are the same as or similar to protocols that are defined by the 802.11 Standard from the Institute of Electrical and Electronics Engineers (IEEE) merely for explanatory purposes. In other embodiments, however, multi-channel communication techniques are utilized in other types of suitable wireless communication systems.

In various embodiments, a WLAN communication channel includes a plurality of component channels that are arranged in one or more channel segments. In some embodiments, the channel segments are contiguous, while in other embodiments the channel segments are non-contiguous, in other words, separated by a frequency gap. In an embodiment, the channel segments are located in different bands, for example, 2.4 GHz, 5 GHz, and 6 GHz bands. In other embodiments, other suitable bands are utilized (e.g., 60 GHz, "sub-1 GHz" or 900 MHz, 3.6 GHz, 4.9 GHz, etc.). In various embodiments, the component channels occupy a 20 MHz bandwidth, 40 MHz bandwidth, 5 MHz bandwidth, or other suitable bandwidth within the corresponding band. In various embodiments, the channel segments include one or more component channels and have a total bandwidth of 20 MHz, 40 MHz, 80 MHz, 160 MHz, 320 MHz, or another suitable total bandwidth.

In various embodiments, a WLAN communication device, for example, an access point (AP), designates the component channels of the WLAN communication channel as "primary" channels or "secondary" channels. The AP utilizes primary channels for various operations, such as for transmission of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc. The AP utilizes the primary and/or secondary channels for packet transfers with other WLAN communication devices (e.g., transferring user data to client stations). In an embodiment, the AP generally reserves the primary channel(s) for management operations associated with the WLAN 110 and does not use the secondary channels for the management operations.

In an embodiment, the WLAN communication channel has only one component channel designated as a primary channel, with remaining component channels designated as secondary channels. In another embodiment, the WLAN communication channel has two or more primary channels, with remaining component channels designated as secondary channels. In some embodiments, at least some of the two or more primary channels are in different bands. For example, a first primary channel is located in the 5 GHz band and a second primary channels is located in the 6 GHz band.

In some embodiments, the AP changes the primary channel from a first component channel to a second component channel. In an embodiment, for example, an AP provides an operating channel for a basic service set (BSS operating channel) for client stations that cannot concurrently utilize the entire BSS operating channel, e.g. the AP provides a 160 MHz BSS operating channel while at least some client stations only support an 80 MHz operating channel. The client stations communicate in different segments of the BSS operating channel (e.g., different 80 MHz segments) and the AP switches the primary channel to serve the client stations communicating in the different segments. In another embodiment, the client station is configured to switch its primary channel.

Before transmitting a media access control protocol data unit (MPDU) via a WLAN communication channel, a first WLAN communication device performs a backoff procedure that includes waiting for an expiration of a backoff timer that corresponds to the primary channel of the WLAN communication channel. In some scenarios, for instance, when switching primary channels, a second WLAN communication device is in the midst of a transmission opportunity (TXOP) and is using (or has reserved) a same component channel to which the primary channel of the first WLAN communication device is to be changed. In some scenarios, the first WLAN communication device may not be able to properly determine whether the component channel is idle or unreserved based on a carrier sense multiple access (CSMA) procedure, for example, when the second WLAN communication device is receiving from a third, "hidden node" WLAN communication device, or when the second WLAN communication device is waiting before transmitting a packet within its TXOP. In these scenarios, the first WLAN communication device may switch its primary channel to the component channel, fail to detect the TXOP of the second WLAN communication device, and begin a transmission that interferes with the TXOP of the second WLAN communication device. In various embodiments, when the primary channel is changed, the AP synchronizes a network allocation vector (NAV) for the component channel that is the new primary channel with other WLAN communication devices that use the component channel, in various embodiments. In an embodiment, for example, the AP starts a NAV synchronization timer and postpones starting the backoff timer until after expiration of the NAV synchronization timer. In some scenarios, the additional "waiting" time of the NAV synchronization timer reduces the likelihood that the AP will attempt to transmit on the new primary channel during the TXOP of another WLAN communication device.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 is implemented, at least partially, on a first IC, and the PHY processor 130 is implemented, at least partially, on a second IC, in various embodiments. As another example, at least a portion of the MAC processor 126 and at least a portion of the PHY processor 130 are implemented on a single IC. For instance, the network interface device 122 is implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 is implemented, at least partially, on a first IC, and the network device 122 is implemented, at least partially, on a second IC, in various embodiments. As another example, the host processor 118 and at least a portion of the network interface device 122 is implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. The PHY processor 130 is configured to receive MAC layer data units from the MAC processor 126 and encapsulate the MAC layer data units to generate PHY data units such as PHY protocol data units (PPDUs) for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc., to provide at least some of the functionality described herein. In another embodiment, the MAC processor 126 includes a hardware state machine that provides at least some of the functionality described herein.

In various embodiments, the MAC processor 126 includes one or more multi-band backoff timers 127 configured to perform one or more backoff procedures in connection with multiple communication channels in multiple RF bands. The backoff procedure involves waiting a period of time before attempting to use a communication channel, according to an embodiment. In an embodiment, the multi-band backoff timers 127 include one or more network allocation vector (NAV) counters for monitoring use of multiple communication channels in multiple RF bands, according to an embodiment. For example, when the access point 114 receives a packet, the MAC processor 126 sets a NAV counter according to a value in a duration field in a MAC header of the packet, at least in some situations, according to an embodiment. The MAC processor 126 monitors the NAV counter to determine when the transmission of the packet has ended. Some packets are configured for reserving a channel for a desired time period and the duration field in the MAC header of the packet is set to the desired time period. When receiving such a packet, the MAC processor 126 sets a NAV counter according to the value in the duration field in a MAC header of the packet. The MAC processor 126 monitors the NAV counter to determine when the reservation of the channel has ended. In some embodiments, the MAC processor 126 includes i) one or more NAV counters, and ii) one or more NAV synchronization timers that allow for synchronization after a primary channel change in an operating channel, as described below.

In an embodiment, the MAC processor 126 and the PHY processor 130 are configured to operate according to a first WLAN communication protocol (e.g., an IEEE 802.11be Standard, or extremely high throughput (EHT)), and also according to one or more second WLAN communication protocols (e.g., as defined by one or more of the IEEE 802.11n Standard, IEEE 802.11ac Standard, the IEEE 802.11ax Standard and/or other suitable WLAN communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 is implemented on at least a first IC, and the PHY processor 170 is implemented on at least a second IC, in various embodiments. As another example, at least a portion of the MAC processor 166 and at least a portion of the PHY processor 170 is implemented on a single IC. For instance, the network interface device 162 is implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 is implemented, at least partially, on a first IC, and the network device 162 is implemented, at least partially, on a second IC, in various embodiments. As another example, the host processor 158 and at least a portion of the network interface device 162 is implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170. The PHY processor 170 is configured to receive MAC layer data units from the MAC processor 166 and encapsulate the MAC layer data units to generate PHY data units such as PPDUs for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. to provide at least some of the functionality described herein. In an embodiment, the MAC processor 166 includes a hardware state machine that provides at least some of the functionality described herein.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the legacy WLAN communication protocol, but not according to the first WLAN communication protocol. Such client stations are referred to herein as "legacy client stations." Similarly, an access point that is similar to the AP 114 and is configured to operate according to the legacy WLAN communication protocol, but not according to the first WLAN communication protocol, is referred to herein as a "legacy AP." More generally, wireless communication devices that are configured to operate according to the legacy WLAN communication protocol, but not according to the first WLAN communication protocol, are referred to herein as a "legacy communication devices."

Figure 2A:
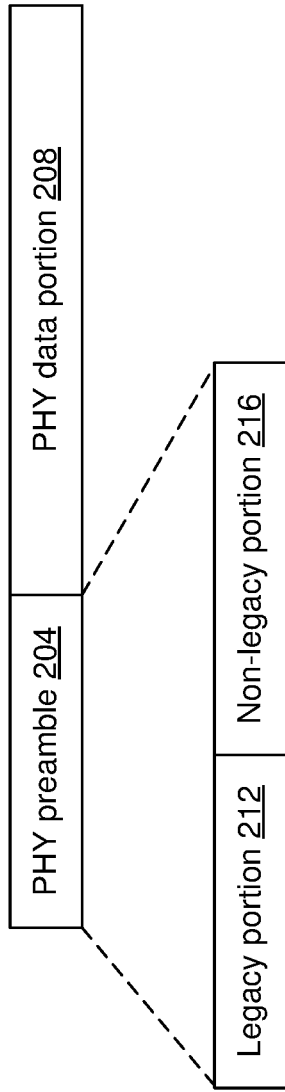
FIG. 2A is a block diagram of an example physical layer (PHY) data unit, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

Figure 2B:
FIG. 2B is a block diagram of an example preamble of a PHY data unit, according to an embodiment.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the AP 114 and a plurality of client stations 154 are configured for multiple user (MU) communication using orthogonal frequency division multiple access (OFDMA) transmissions. In an embodiment, the PPDU 200 is an MU OFDMA data unit in which independent data streams are transmitted to or by multiple client stations 154 using respective sets of OFDM tones allocated to the client stations 154. For example, in an embodiment, available OFDM tones (e.g., OFDM tones that are not used as DC tones and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, an operating communication channel of a communication device in the WLAN 110 is divided into a plurality of smaller component channels, each corresponding to a width of 20 MHz, or another suitable frequency bandwidth. Multiple component channels are concatenated, or "bonded" to form a wider channel, in some embodiments. For instance, a 40 MHz channel is formed by combining two 20 MHz component channels, an 80 MHz channel is formed by combining two 40 MHz channels, and a 160 MHz channel is formed by combining two 80 MHz channels, in various embodiments. In an embodiment, the operating frequency band is divided into component channels of a width different than 20 MHz. In some embodiments, the component channels are aggregated, as described below.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy portion 212 corresponding to the 20 MHz component channel bandwidth is replicated in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment corresponding to multi-channel operation, two or more communication channels (also sometimes referred to herein as a "channel segments") are aggregated to form an aggregate channel for simultaneous transmission or reception over the two or more aggregated communication channels in the WLAN 110. For instance, in an embodiment, the AP 114 is configured to transmit a first signal in a first communication channel segment (sometimes referred to herein as "first channel segment"), and simultaneously transmit a second signal over a second channel segment (sometimes referred to herein as "second channel segment") where the first and second channel segments do not overlap. In some embodiments, the AP 114 commences transmission of the first signal and the second signal at a same start time (e.g., synchronously), for example, using multiple RF radios, as described herein. In an embodiment, the AP 114 is configured to cease transmission of the first signal and the second signal at a same end time. In an embodiment, the AP 114 is configured to cease transmission of the first signal and the second signal at different end times. In an embodiment, the AP 114 is configured to receive a first signal in a first channel segment and simultaneously receive a second signal over a second channel segment, wherein the first signal and the second signal have an identical start time. In an embodiment, the first signal and the second signal have identical end times. In another embodiment, the first signal and the second signal have different end times.

In an embodiment corresponding to multi-channel operation, the first channel segment and the second channel segment are non-contiguous, i.e., there is a gap in frequency between the first channel segment and the second channel segment. In another embodiment, the first channel segment and the second channel segment are contiguous, i.e., there is no frequency gap between the first channel segment and the second channel segment. In an embodiment, the first channel segment and the second channel segment are of different frequency bandwidths. In an embodiment, the first channel segment and the second channel segment consist of respective different numbers of component channels. In another embodiment, the first channel segment and the second channel segment are of a same bandwidth and consist of a same number of component channels.

In an embodiment, different communication devices (i.e., the AP 114 and the client stations 154) are configured for operation in different frequency bands. In an embodiment, at least some communication devices (e.g., the AP 114 and the client station 154) in the WLAN 110 are configured for operation over multiple different frequency bands. Example frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprises plural component channels which are, in some embodiments, combined within the respective frequency bands to generate channels of wider bandwidths, as described above. In an embodiment corresponding to multi-channel operation over multiple communication channel segments aggregated to form an aggregated communication channel, at least some of the multiple channel segments are in different ones of multiple frequency bands, or the multiple channel segments are within a same frequency band.

In an embodiment, the first WLAN communication protocol permits a greater variety of communication channel configurations than is permitted by the legacy WLAN communication protocol. For example, the legacy WLAN communication protocol permits certain combinations of component channels to form communication channels of certain bandwidths, whereas the first WLAN communication protocol permits additional component channel combinations in addition to the component channel combinations permitted by the legacy WLAN communication protocol. For example, whereas the legacy WLAN communication protocol permits contiguous bandwidths of 20 MHz, 40 MHz, 80 MHz, and 160 MHz and a split frequency bandwidth 80+80 MHz, the first WLAN communication protocol additionally permits contiguous bandwidths of 60 MHz, 100 MHz, 120 MHz, 140 MHz, and split frequency bandwidths of 20+20 MHz, 20+40 MHz, 20+80 MHz, 40+40 MHz, 40+80 MHz, etc., in various embodiments.

In an embodiment, a communication device (e.g., the AP 114, the client station 154-1, etc.) configured to operate according to the first WLAN communication protocol includes multiple RF radios, where respective ones of the multiple RF radios transmit/receive signals in respective RF channel segments of an aggregate communication channel. In some embodiments, the signals transmitted/received by respective ones of the multiple RF radios are synchronously transmitted/received in contiguous or non-contiguous channel segments. For example, a signal transmitted/received in an 80 MHz-wide channel segment by a first RF radio and a signal in a 40 MHz-wide channel segment is synchronously transmitted/received by a second RF radio, where the 80 MHz-wide and the 40 MHz-wide channel segments form a contiguous 120 MHz channel bandwidth in one embodiment, and form a non-contiguous 80+40 MHz channel bandwidth in another embodiment. In some embodiments, the signals transmitted/received by respective ones of the multiple RF radios are asynchronously transmitted/received in the contiguous or non-contiguous channel segments. In other words, signals transmitted or received by a first RF radio do not need to be synchronized in time with signals transmitted or received by a second RF radio. In an embodiment, for example, a first RF radio of a communication device transmits a first signal while a second RF radio of the communication device simultaneously receives (or transmits) a second signal, where the second RF radio begins transmitting or receiving the second signal after the first RF radio has begun transmitting the first RF signal (see, e.g., FIG. 9).

Figure 3A:
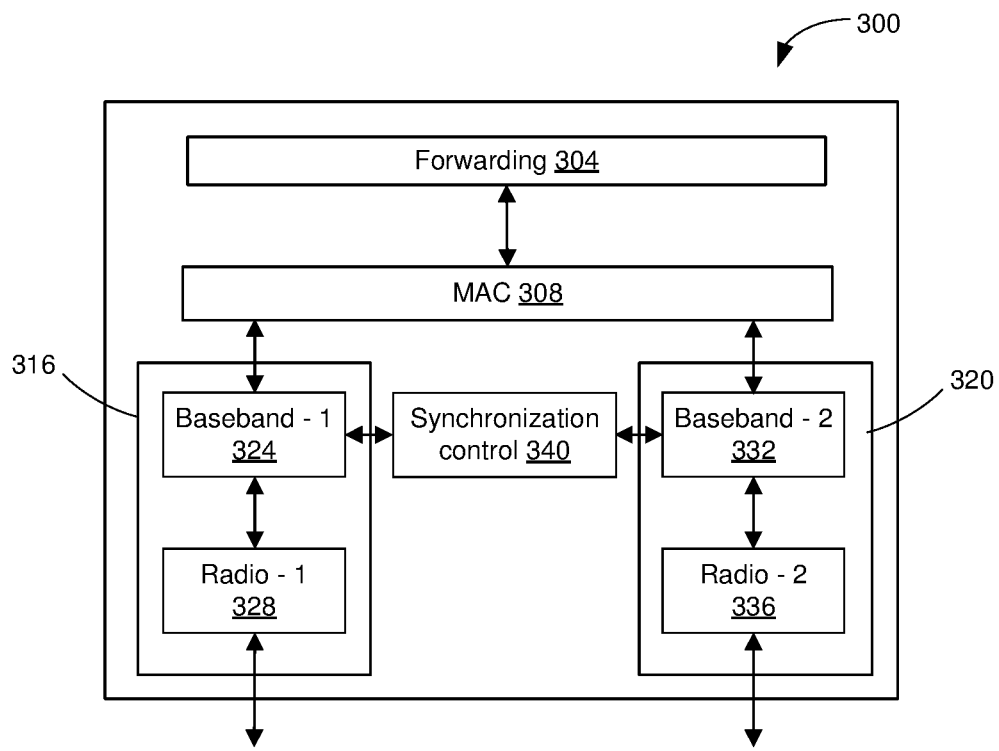
FIG. 3A is a diagram of an example system architecture corresponding to a communication device configured for multi-channel operation, according to an embodiment.

FIG. 3A is a diagram of an example system architecture 300 corresponding to a communication device configured for multi-channel operation, according to an embodiment. For instance, in an embodiment, the system architecture 300 is configured for transmission/reception over aggregated communication channel segments. In an embodiment, the system architecture 300 corresponds to the AP 114. In another embodiment, the system architecture 300 corresponds to the client station 154-1. In various embodiments, the system architecture 300 is configured for simultaneous transmission and/or reception over the aggregated communication channel. In an embodiment, the system architecture 300 is configured for synchronous transmission and/or reception over the aggregated communication channel. In an embodiment, the system architecture 300 is configured for asynchronous transmission and/or reception over the aggregated communication channel. In another embodiment, the system architecture is configured for both synchronous and asynchronous transmission and/or reception over the aggregated communication channel.

In an embodiment, the system architecture 300 is configured for operation over two communication channel segments and includes a forwarding processor 304. The communication device 300 also includes a single MAC processor 308, a first PHY processor 316, and a second PHY processor 320. The single MAC processor 308 is coupled to the first PHY processor 316 and the second PHY processor 320. The single MAC processor 308 exchanges frames with the first PHY processor 316 and the second PHY processor 320. In an embodiment, the MAC layer has an interface, for example, a data service access point (SAP) interface, to a layer above the MAC layer (e.g., a logical link control layer or network layer in the Open Systems Interconnection model). In another embodiment, the interface (i.e., data SAP interface) between the MAC layer and the layer above the MAC layer is integral with the MAC layer.

In an embodiment, the single MAC processor 308 corresponds to the MAC processor 126 of FIG. 1. In another embodiment, the single MAC processor 308 corresponds to the MAC processor 166 of FIG. 1. In an embodiment, the first PHY processor 316 and the second PHY processor 320 correspond to the PHY processor 130 of FIG. 1. In another embodiment, the first PHY processor 316 and the second PHY processor 320 correspond to the PHY processor 170 of FIG. 1.

The first PHY processor 316 includes a first baseband signal processor 324 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In an embodiment, the RF radio 328 is configured to operate on a first RF band, and the RF radio 336 is configured to operate on a second RF band. In another embodiment, the RF radio 328 and the RF radio 336 are both configured to operate on the same RF band.

In an embodiment, the MAC processor 308 generates and parses data corresponding to MAC layer data units (e.g., frames) into a plurality of data streams corresponding to respective communication channel segments. In an embodiment, the frames can be transmitted in any channel segments dynamically, i.e., without a band switch negotiation. The MAC processor 308 provides the parsed data streams to the Baseband-1 324 and the Baseband-2 332. The Baseband-1 324 and the Baseband-2 332 are configured to receive the respective data streams from the MAC processor 308, and encapsulate and encode the respective data streams to generate respective baseband signals corresponding to PPDUs. In an embodiment, the respective baseband signals have different bandwidths. The Baseband-1 324 and the Baseband-2 332 provide the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 328 transmits a first RF signal via the first channel segment and the Radio-2 336 transmits a second RF signal via a second channel segment.

The communication device 300 also includes synchronization control circuitry 340, in some embodiments. The synchronization control circuitry 340 is configured to ensure that respective transmitted signals over the first channel segment and the second channel segment are synchronized. The synchronization control circuitry 340 is coupled to the Baseband-1 324 and the Baseband-2 332 to ensure that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the respective baseband signal processors Baseband-1 324 and Baseband-2 332. The Baseband-1 324 and the Baseband-2 332 generate respective data streams that are provided to the MAC processor 308. The MAC processor 308 processes the respective data streams. In an embodiment, the MAC processor 308 deparses the data streams received from the Baseband-1 324 and the Baseband-2 332 into a single information bit stream.

In an embodiment, the forwarding processor 304 is omitted and the MAC processor 308 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 3B:
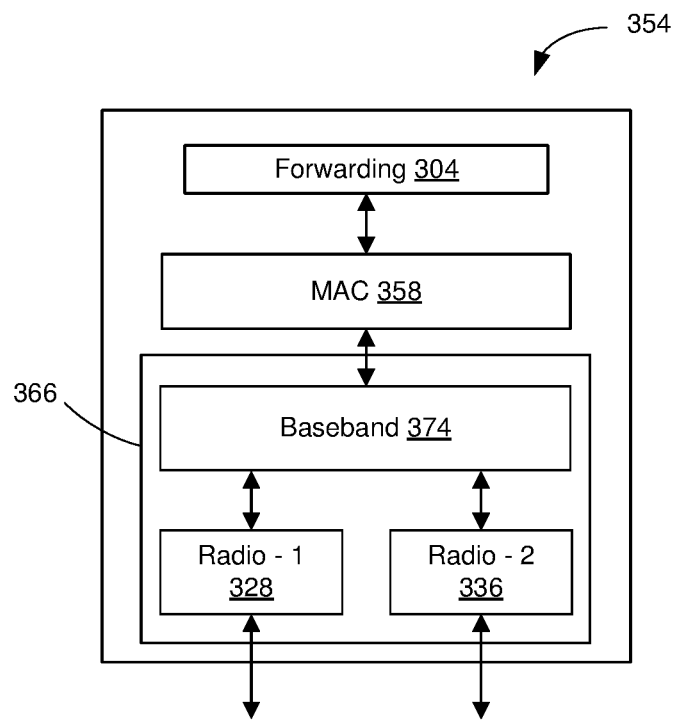
FIG. 3B is a diagram of an example system architecture corresponding to a communication device configured for multi-channel operation, according to another embodiment.

FIG. 3B is a diagram of an example system architecture 350 corresponding to a communication device configured for multi-channel operation, according to another embodiment. For instance, in an embodiment, the system architecture 350 is configured for synchronous and/or asynchronous transmission/reception over aggregated communication channels. In an embodiment, the system architecture 350 corresponds to the AP 114. In another embodiment, the system architecture 350 corresponds to the client station 154-1.

The system architecture 350 is similar to the system architecture 300 of FIG. 3A, and like-numbered elements are not discussed in detail for purposes of brevity. The communication device 350 includes a single MAC processor 358 coupled to a PHY processor 366. The single MAC processor 308 exchanges frames with the PHY processor 366. In an embodiment, the single MAC processor 358 corresponds to the MAC processor 126 of FIG. 1. In another embodiment, the single MAC processor 358 corresponds to the MAC processor 166 of FIG. 1. In an embodiment, the PHY processor 366 corresponds to the PHY processor 130 of FIG. 1. In another embodiment, the PHY processor 366 corresponds to the PHY processor 170 of FIG. 1. The PHY processor 366 includes a single baseband signal processor 374. The single baseband signal processor 374 is coupled to the Radio-1 328 and the Radio-2 336.

In an embodiment, the MAC processor 358 generates data corresponding to MAC layer data units (e.g., frames) and provides the frames to the baseband signal processor 374. The baseband signal processor 374 is configured to receive frames from the MAC processor 358, and parse data corresponding to the frames into a plurality of bit streams. The baseband signal processor 374 is also configured to encapsulate and encode the respective bit streams to generate respective baseband signals corresponding to PPDUs. In an embodiment, the respective baseband signals have different bandwidths. The baseband signal processor 374 provides the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 820 transmits a first RF signal via the first channel segment and the Radio-2 336 transmits a second RF signal via a second channel segment.

The baseband signal processor 374 is configured to ensure that respective transmitted signals over the first channel segment and the second channel segment are synchronized. For example, the baseband signal processor 374 is configured to generate the respective baseband signals such that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the baseband signal processor 374. The baseband signal processor 374 generate respective bit streams, and de-parse the bit streams into a data stream corresponding to frames. The baseband signal processor 374 provides the frames to the MAC processor 358. The MAC processor 358 processes the frames.

As discussed above, in an embodiment, an operating communication channel of a communication device in the WLAN 110 is divided into a plurality of smaller component channels. In an embodiment, at least one of the smaller component channels is designated as a primary channel and the remaining component channels are secondary channels. In an embodiment, as described above, the primary channel is utilized for both management transmissions and data transmissions, while secondary channels are used for data transmissions but not management transmissions. A communication device (e.g., the AP 114 or the client station 154-1) operating in the WLAN 110 utilizes the at least one smaller component channel that is designated as a primary channel for various operations, such as for transmission of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc. In an embodiment, an aggregate operating channel of a communication device (e.g., the AP 114 or the client station 154-1) includes multiple primary channels. For example, in an embodiment in which a first channel segment is aggregated with a second channel segment to form an aggregated communication channel, a first component channel in the first channel segment is designated as a first primary channel of the aggregate communication channel and a second component channel in the second channel segment is designated in a second primary channel of the aggregate communication channel. In another embodiment, an aggregate communication channel of a communication device (e.g., the AP 114 or the client station 154-1) includes a single primary channel. For example, in an embodiment in which a first channel segment is aggregated with a second channel segment form an aggregate communication channel, a component channel in one of the first channel segment and the second channel segment is designated as a primary channel of the aggregate communication channel. The other one of the first channel segment and the second channel segment does not include a primary channel, in this embodiment.

Figure 4B:
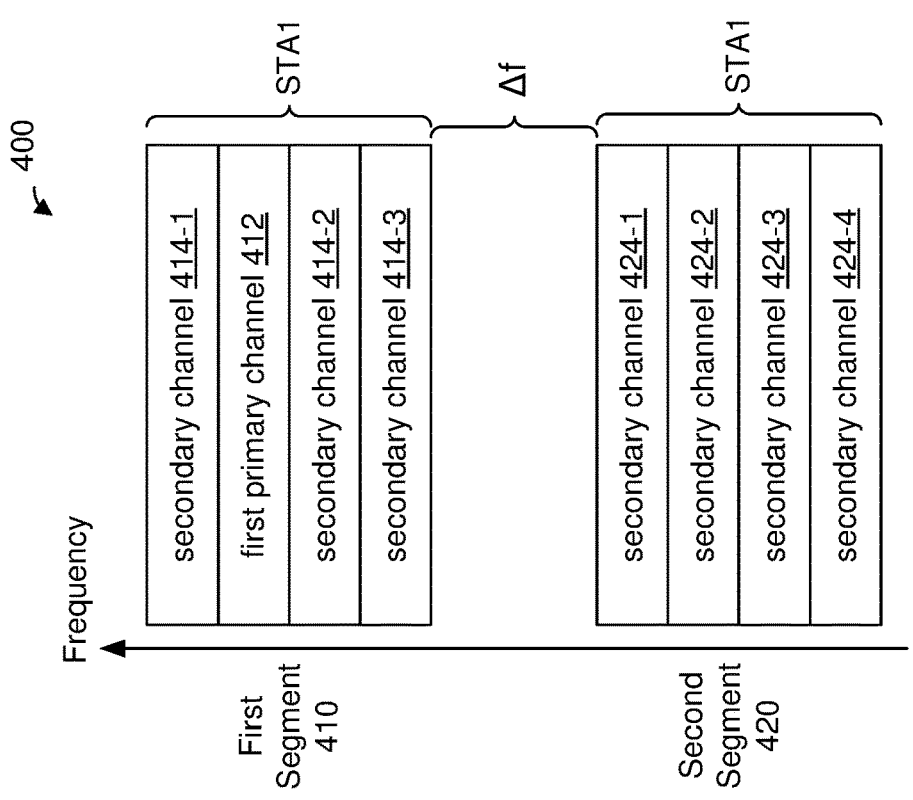
FIG. 4B is a diagram of the example operating channel of FIG. 4A at a second time, according to another embodiment.
Figure 4A:
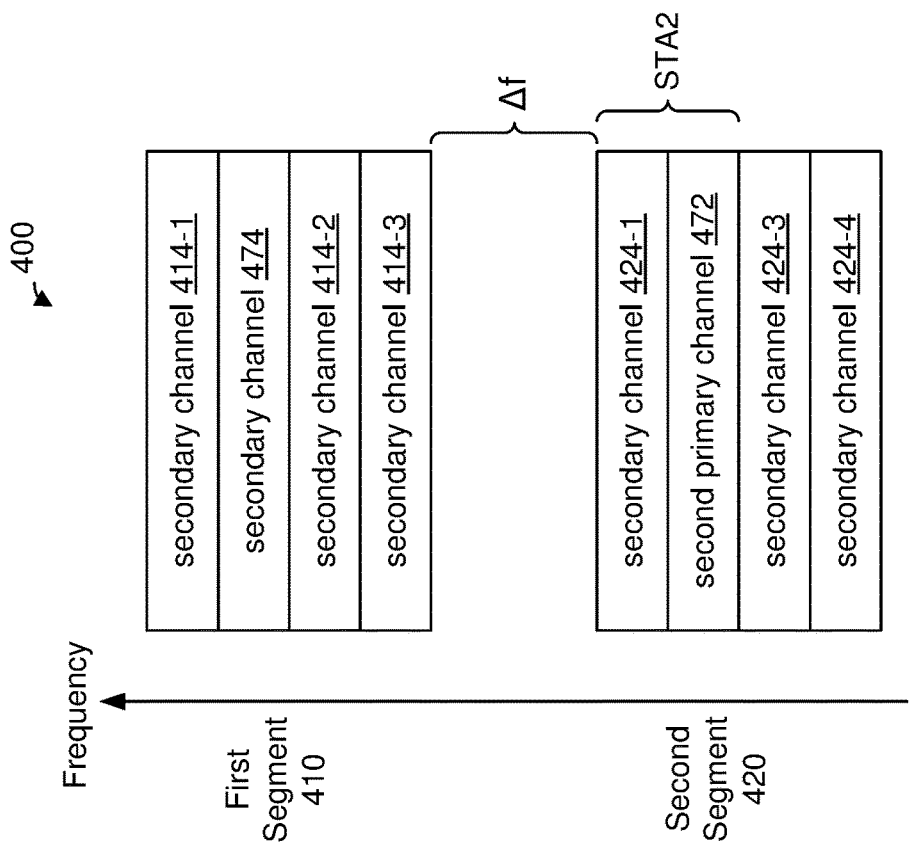
FIG. 4A is a diagram of an example operating channel at a first time, according to an embodiment.

FIG. 4A is a diagram of an example operating channel 400 at a first time, according to an embodiment. In an embodiment, the operating channel 400 corresponds to an operating channel of the AP 114, or of a basic service set (BSS) supported by the AP 114. In another embodiment, the operating channel 400 corresponds to an operating channel of a client station 154 (e.g., the client station 154-1). In other embodiments, the operating channel 400 is employed by a communication device (e.g., an AP or a client station) in a suitable communication network different from the WLAN 110. An operating channel such as the operating channel 400 that corresponds to an operating channel of an AP or a BSS supported by the AP is sometimes referred to herein as an "AP operating channel" or a "BSS operating channel." An operating channel such as the operating channel 400 that corresponds to an operating channel of a client station is sometimes referred to herein as an "STA operating channel." In the embodiment shown in FIG. 4A, the operating channel 400 corresponds to the AP 114 and a first client station STA1.

The operating channel 400 includes a first channel segment 410 aggregated with a second channel segment 420. The first channel segment 410 occupies a first frequency bandwidth and comprises a first number of component channels, and the second channel segment 420 occupies a second frequency bandwidth and comprises a second number of component channels. In various embodiments, the first bandwidth of the first channel segment 410 and the second bandwidth of the second channel segment 420 are equal or are unequal. In various embodiments, the first number of component channels of the first channel segment 410 and the second number of composite channels of the second channel segment 420 are equal or are unequal.

In an embodiment, the first channel segment 410 and the second channel segment 420 are non-adjacent in frequency (e.g., are non-contiguous). For example, a gap in frequency exists between the first channel segment 410 and the second first channel segment 420. In various embodiments, the gap is at least 500 kHz, at least 1 MHz, at least 5 MHz, at least 20 MHz, etc. In some embodiments, the first channel segment 410 and the second channel segment 420 are located in different bands, for example, 2.4 GHz, 5 GHz, and 6 GHz bands. In other embodiments, other suitable bands are utilized (e.g., 60 GHz, "sub-1 GHz" or 900 MHz, 3.6 GHz, 4.9 GHz, etc.). In another embodiment, the first channel segment 410 and the second channel segment 420 are adjacent in frequency (e.g., contiguous). In this embodiment, there is no frequency gap between first channel segment 410 and the second channel segment 420.

In an example embodiment, the first channel segment 410 has a bandwidth of 80 MHz and the second channel segment 420 has a bandwidth of 80 MHz. In an embodiment in which the first channel segment 410 and the second channel segment 420 are not adjacent in frequency, the operating channel 400 is sometimes referred to as an 80+80 MHz channel. On the other hand, in an embodiment in which the first channel segment 410 and the second channel segment 420 are adjacent in frequency, the operating 400 is sometimes referred to as 160 MHz channel. In general, communication channels similar to the operating channel 400 in which the first channel segment and the second channel segment are not adjacent in frequency, the aggregate communication channel is referred to as (bandwidth of the first channel segment)+(bandwidth of the second channel segment) channel. On the other hand, communication channels similar to the operating channel 400 in which the first channel segment and the second channel segment are adjacent in frequency, or in which the second channel segment 420 is omitted (i.e., the second channel segment 420 has a bandwidth of 0 MHz), the aggregate communication channel 400 is referred to as (the sum of the first channel segment bandwidth and the second channel segment bandwidth) channel. In an embodiment, valid channel configurations of the aggregate communication channel 400 include: 20 MHz channel, 40 MHz channel, 60 MHz channel, 80 MHz channel, 100 MHz, 120 MHz channel, 140 MHz channel, 160 MHz channel, 320 MHz channel, 20+40 MHz channel, 20+80 MHz channel, 40+80 MHz channel, 20+160 MHz, 40+320 MHz, and so on. In an embodiment, a respective bandwidth of each channel segment 410, 420 is selected from a set of possible channel bandwidths of 20 MHz, 40 MHz and 80 MHz. In other embodiments, other suitable sets of possible bandwidths are utilized.

At the first time shown in FIG. 4A, the operating channel 400, includes a single primary channel. For example, the AP 114 designates a single component channel of the first channel segment 410 as a primary channel, in an embodiment. In the illustrated embodiment, a first component channel of the first channel segment 410 is designated as a first primary channel 412. In some embodiments, the operating channel 400 includes more than two primary channels.

For example, more than two component channels of the operating channel 400 are designated as primary channels, in some embodiments.

The operating channel 400 also includes secondary channels, in an embodiment. In an embodiment, the AP 114 designates each component channel of the first channel segment 410 and the second channel segment 420 that is not designated as a primary channel as a secondary channel. In the illustrated embodiment, the first channel segment 410 includes three secondary channels 414 and the second channel segment 420 includes three secondary channels 424. In other embodiments, the first channel segment 410 and/or the second channel segment 420 includes another suitable number (e.g., 0, 1, 2, 4, 5, etc.) of secondary channels 414, 424. In some embodiments, the number of secondary channels 414 of the first channel segment 410 is not equal to the number of secondary channels 424 of the second channel segment 420.

In some embodiments, the AP 114 generates one or more MAC data units to include i) a first primary channel indication indicating a first location, in the first channel segment 410, of the first primary channel and ii) a second primary channel indication indicating a second location, in the second channel segment 420, of the second primary channel.

FIG. 4B is a diagram of the operating channel 400 at a second time, according to an embodiment. At the second time, the primary channel of the operating channel 400 has been changed to a different component channel. In an embodiment, for example, the AP 114 designates a second component channel that was previously designated as a secondary channel (e.g., secondary channel 424-2) as a second primary channel 472 and designates the first primary channel 412 as a secondary channel 474. In an embodiment, for example, the AP 114 utilizes the first primary channel 412 for at least one of transmitting or receiving MPDUs via the first component channel, before designating the second component channel as the second primary channel 472. In an embodiment, when designating a component channel as a primary channel, the AP 114 creates or initializes one or more backoff timers (e.g., backoff timers 127) for the component channel. In an embodiment, when designating a component channel as a secondary channel, the AP 114 removes or suspends one or more backoff timers. Although the second primary channel 472 is located in the second segment 420 in the embodiment shown in FIG. 4B, in other embodiments, the second primary channel is located in the first segment 410 (e.g., at secondary channel 414-3).

In an embodiment, legacy client stations that conform to the legacy protocol do not support an operating channel in multiple channel segments or with multiple primary channels. In some embodiments, to facilitate interoperability of the AP 114 with legacy client stations, the first communication protocol does not permit multiple primary channels in an AP operating channel when the AP operating channel is also supported by the legacy protocol. Accordingly, in an embodiment, the AP 114 is configured to operate with an AP operating channel that includes a single primary channel when the operating channel is also permitted by the legacy protocol, and to operate with an AP operating channel that includes multiple primary channels when the operating channel is not permitted by the legacy protocol.

In some embodiments, an operating channel of a client station (e.g., the client station 154-1) has a bandwidth that is narrower than a bandwidth of an operating channel of the AP 114. In an embodiment, a client station 154 (e.g., the client station 154-1) operating with an operating channel that is narrower than an operating channel of the AP 114 is permitted to operate at any location within the operating channel of the AP 114. For example, the client station 154-1 is permitted to operate with an operating channel that does not cover a primary channel of the AP 114. In another embodiment, the client station 154 (e.g., the client station 154-1) operating with an operating channel that is narrower than an operating channel of the AP 114 is not permitted to operate with an operating channel that does not cover a primary channel of the AP 114. In this embodiment, an operating channel of the client station 154 (e.g., the client station 154-1) that is narrower than an operating channel of the AP 114 operates at a location within the operating channel of the AP 114 that covers at least one primary channel of the AP 114.

In the embodiment shown in FIG. 4B, the AP 114 changes from the first primary channel 412 (FIG. 4A) to the second primary channel 472 to support a legacy client station STA2 that has an operating channel that only includes the second primary channel 472 and the secondary channel 424-1 in the second segment 420. In an embodiment, the AP 114 receives an indication of the operating channel of the legacy client station STA2 where the operating channel i) does not include any primary channel of the operating channel of the AP 114 and ii) spans multiple secondary channels of the operating channel of the AP 114, and the AP 114 changes the primary channel in response to the indication.

In some embodiments, the AP 114 provides an explicit indication of the change in the primary channel to one or more client stations. In an embodiment, the AP 114 generates one or more MPDUs that include an explicit indication of the designation of the second component channel as the primary channel 472. In this embodiment, the AP 114 transmits the MPDU using at least one of the first component channel and the second component channel. In other words, the AP 114 transmits the explicit indication via the first primary channel 412 (e.g., before or after the change), via the second primary channel 472 (e.g., before or after the change), or via both the first primary channel 412 and the second primary channel 472.

In an embodiment, the AP 114 generates a bandwidth indication of the bandwidth of the second primary channel 472 in the second segment 420 that identifies the second component channel as the second primary channel 472. In an embodiment, the AP 114 generates an MPDU that includes the bandwidth indication. In an embodiment, the bandwidth indication is a field within a MAC header of the MPDU. In another embodiment, the bandwidth indication is a field within a management frame.

In some embodiments, the AP 114 provides an implicit indication of the change in the primary channel to one or more client stations. In an embodiment, for example, the primary channel (e.g., one of the first primary channel 412 or the second primary channel 472) corresponds to a particular predetermined time period. In various embodiments, the predetermined time period is a service period, for example, a target wake time (TWT) service period.

Figure 5:
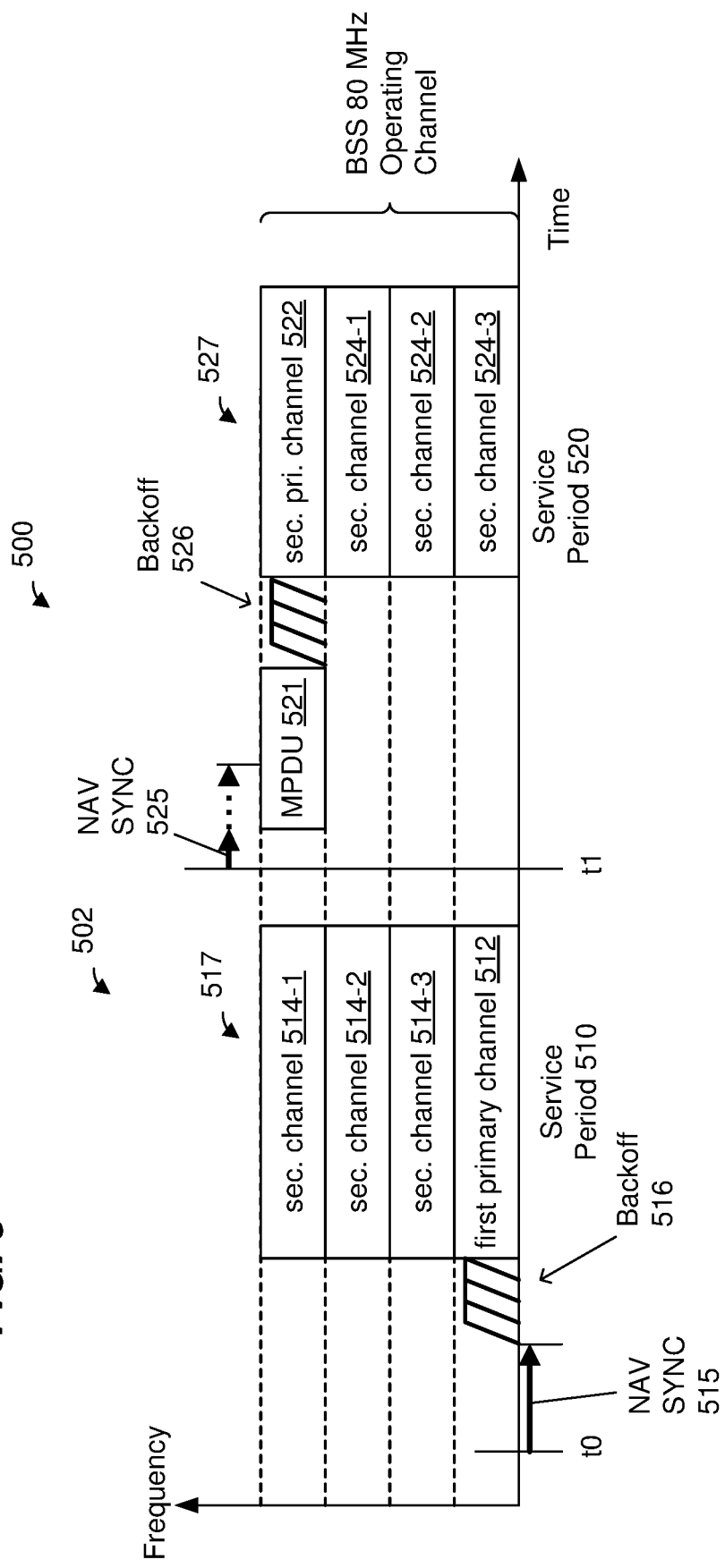
FIG. 5 is an example timing diagram of a backoff timer synchronization after a primary channel change in an operating channel, in an embodiment.

FIG. 5 is an example timing diagram 500 of a backoff timer synchronization after a primary channel change in an operating channel 502, in an embodiment. In an embodiment, the operating channel 502 corresponds to an operating channel of the AP 114, or of a basic service set (BSS) supported by the AP 114. In an embodiment, the operating channel 502 corresponds to an operating channel of a client station 154 (e.g., the client station 154-1). In other embodiments, the operating channel 502 is employed by a communication device (e.g., an AP or a client station) in a suitable communication network different from the WLAN 110.

The operating channel 502 is similar to the operating channel 400, but includes four component channels. Although the component channels are shown as being contiguous, in other embodiments, one or more of the component channels are located in different frequency bands and/or are separated by a frequency gap, as described above. In the embodiment shown in FIG. 5, the AP 114 changes the primary channel of the operating channel 502 at a time t0 and at a time t1, which correspond to start times of a first service period 510 and a second service period 520, respectively. In other embodiments, the AP 114 changes the primary channel at a different suitable time, for example, in response to an MPDU or PPDU from a client station.

In an embodiment, the first and second service periods 510 and 520 correspond to different TWT service periods. During the first service period 510, the AP 114 designates a first component channel as a primary channel 512 and remaining component channels as secondary channels 514-1, 514-2, and 514-3. During the second service period 520, the AP 114 designates a second component channel (i.e., the secondary channel 514-1) as a primary channel 522 and designates the remaining component channels as secondary channels 524-1, 524-2, and 524-3. Accordingly, the first primary channel 512 is re-designated as a secondary channel 524-3.

Before transmitting MPDUs via the operating channel 502, the AP 114 performs a backoff procedure that includes waiting for an expiration of a backoff timer that corresponds to the primary channel. When the primary channel is changed (e.g., from the primary channel 512 to 522), the AP 114 synchronizes a backoff timer 516, which corresponds to the component channel that is the new primary channel, with other devices that use the component channel, in various embodiments. In an embodiment, for example, the AP 114 starts a network allocation vector (NAV) synchronization timer 515 and starts the backoff timer 516 after expiration of the NAV synchronization timer 515. In an embodiment, the backoff timer 516 is a NAV. In an embodiment, the NAV synchronization timer 515 and the NAV 516 correspond to the multi-band backoff timers 127 (FIG. 1). When starting the second service period 520 at the time t1, the AP 114 starts a NAV synchronization timer 525 and starts a backoff timer 526 after expiration of the NAV synchronization timer 525, where the NAV synchronization timer 525 and backoff timer 526 correspond to the second primary channel 522.

During the NAV synchronization timers 515 and 525, (i.e., while the timers run and before their respective expirations), the AP 114 monitors the medium of the primary channel for transmissions by other communication devices. In an embodiment, when the AP 114 does not receive or detect a frame in the medium before the NAV synchronization timer expires (e.g., becomes "0"), the AP starts the backoff timer 516. In the embodiment shown in FIG. 5, the AP 114 transmits a PPDU 517 after expiration of the backoff timer 516. When the AP 114 receives or detects a frame (e.g., MPDU 521) in the medium before the NAV synchronization timer expires, the AP 114 synchronizes the backoff timer 526 using the detected frame. In an embodiment, for example, the AP 114 receives the MPDU 521 that includes a NAV indication via the primary channel 522 during the NAV synchronization timer 525, stops the NAV synchronization timer 525, and sets the backoff timer 526 using the NAV indication. In an embodiment, the NAV indication is a high efficiency (HE) physical layer (PHY) header that includes a duration field. In another embodiment, the NAV indication is included in a suitable field of a PHY header or MAC header that corresponds to the MPDU received during the NAV synchronization timer 525.

In various embodiments, the backoff timers 516 and 526 are set based on a group of respective backoff parameters, for example, for each access category (AC) (i.e., one of AC_BE (best effort), AC_BK (background), AC_VI (video), AC_VO (voice)), there is a backoff timer (e.g., an instance of the backoff timer 516 or 526), a contention window CW, a contention window minimum (CWmin), a contention window maximum (CWmax), a slot time, an arbitrary inter-frame space number (AIFSN), a quality of service short retry counter (QSRC), and a quality of service long retry counter (QLRC). In an embodiment, the AP 114 is configured to set the backoff parameters for the backoff timers 516 and 526 to values that correspond to a successful frame exchange (e.g., setting a contention window value to CWmin). In another embodiment, the AP 114 is configured to set the backoff parameters to values that correspond to a service period (i.e., using values corresponding to service period 520 for backoff timer 526). In yet another embodiment, the AP 114 is configured set the backoff parameters to values that correspond to the prior primary channel (i.e., using values corresponding to backoff timer 516 for the backoff timer 526).

FIG. 6A and FIG. 6B are example timing diagrams 600 and 650 for a WLAN communication device configured to use separate groups of backoff timers, i.e. one group of backoff timers (backoff timers for AC_BE, AC_BK, AC_VI, AC_VO), for each primary channel in multiple component channels of a WLAN communication channel 602 with multiple primary channels, in an embodiment. In an embodiment, the operating channel 602 corresponds to an operating channel of the AP 114, or of a basic service set (BSS) supported by the AP 114. In an embodiment, the operating channel 602 corresponds to an operating channel of a client station 154 (e.g., the client station 154-1). In other embodiments, the operating channel 602 is employed by a communication device (e.g., an AP or a client station) in a suitable communication network different from the WLAN 110. The operating channel 602 is similar to the operating channel 400 and operating channel 500, but includes four component channels Ch0, Ch1, Ch2, and Ch3 and has multiple primary channels at the same time (i.e., Ch0 and Ch3). Although the component channels are shown as being contiguous, in other embodiments, one or more of the component channels are located in different frequency bands with one (or more) primary channel in each band and/or are separated by a frequency gap, as described above. In an embodiment, for example, the component channels Ch0 and Ch1 are located in a channel segment within a 5 GHz band and the component channels Ch2 and Ch3 are located in a channel segment within a 6 GHz band.

In some embodiments, the AP 114 (or a client station 154) is configured to use multiple primary channels over the operating channel 602 where each primary channel corresponds to its own group of backoff timers (backoff timers for AC_BE, AC_BK, AC_VI, AC_VO). In the embodiment shown in FIG. 6A, the AP 114 designates component channels Ch0 and Ch3 as primary channels over the operating channel 602, corresponding to backoff timers 606 and 636, respectively, and designates component channels Ch1 and Ch2 as secondary channels. In other embodiments, the AP 114 uses additional or fewer primary channels over a different suitable operating channel.

In an embodiment, the AP 114 checks an idle/busy status of other primary channels and secondary channels, for example, component channel Ch3 (primary) and component channels Ch1 and Ch2 (secondary), when the backoff timer 606 expires before performing a transmission. When one or more other component channels are idle within a suitable time period (e.g., a point control function interframe space, distributed control function interframe space) before the backoff timer 516 expires, the AP 114 performs, schedules, or triggers an uplink or downlink transmission in the one or more idle component channels. In some embodiments, the backoff timers of any band can be used for the backoff of simultaneous transmission of multiple bands (channel segments). In some embodiments, the backoff timers of a specific channel segment can be used for the backoff of simultaneous transmission of multiple bands (channel segments), while the backoff timers of another channel segment can only be used for the transmission of the channel segment. In an embodiment, the channel segment can be a dedicated channel segment or a channel segment having a lower load compared to other channel segments. In some embodiments, the backoff timers of a channel segment being used for the backoff of simultaneous transmission of multiple bands (channel segments) are toggled backoff timers of the channel segments. In other words, when the backoff timer of the channel segment1 is used for a simultaneous transmission via channel segment1 and channel segment2, then the backoff timer of the channel segment2 is used for a next simultaneous transmission of multiple channel segments. In some embodiments, when a channel segment whose backoff timer is not 0 is used for a simultaneous transmission, the backoff timer of the channel segment will be increased by a random or pseudo-random value, for example, per the current CW. In some embodiments, when the backoff timer of a primary channel related to a channel segment becomes 0, the channel segment is combined with other channel segments whose backoff timers become 0. In an embodiment, for a channel segment with backoff timer being 0, the corresponding secondary channels that are idle are used for the simultaneous transmission. In some embodiments, when a channel segment whose backoff timer becomes 0, the AP 114 waits until the backoff timer of another channel segment becomes zero for a simultaneous transmission.

In some embodiments, the AP 114 utilizes only those idle component channels that satisfy corresponding channel bounding rules for transmission. In the embodiment shown in FIG. 6A, the AP 114 determines that component channel Ch2 is busy, component channels Ch0, Ch1, and Ch3 are idle, but that channel bounding rules do not allow for a punctured PPDU. In this embodiment, the AP 114 transmits an unpunctured downlink PPDU 640 and receives an unpunctured uplink PPDU 642 that utilize only the component channels Ch0 and Ch1. After the exchange of the PPDUs 640 and 642, the AP 114 sets the contention window for both the backoff timer 606 and the backoff timer 636 to CWmin to indicate a successful frame exchange.

In the embodiment shown in FIG. 6B, the AP 114 determines that component channel Ch2 is busy, component channels Ch0, Ch1, and Ch3 are idle, and that channel bounding rules allow for a punctured PPDU. In this embodiment, the AP 114 transmits a punctured downlink PPDU 690 and receives an unpunctured uplink PPDU 692 that utilize the component channels Ch0, Ch1, and Ch3. After the exchange of the PPDUs 690 and 692, the AP 114 sets the contention window for both the backoff timer 606 and the backoff timer 636 to CWmin to indicate a successful frame exchange.

FIG. 7 is an example timing diagrams 700 for a WLAN communication device configured to use separate sets of backoff timers (i.e. one set of backoff timers for AC_BE, AC_BK, QC_VI, QC_VO) in multiple component primary channels of a WLAN communication channel 702, in an embodiment. In an embodiment, the operating channel 702 corresponds to an operating channel of the AP 114, or of a basic service set (BSS) supported by the AP 114. In an embodiment, the operating channel 702 corresponds to an operating channel of a client station 154 (e.g., the client station 154-1). In other embodiments, the operating channel 702 is employed by a communication device (e.g., an AP or a client station) in a suitable communication network different from the WLAN 110. The operating channel 702 is similar to the operating channel 600 and includes four component channels Ch0, Ch1, Ch2, and Ch3. Although the component channels are shown as being contiguous, in other embodiments, one or more of the component channels are located in different frequency bands and/or are separated by a frequency gap, as described above.

In some embodiments, the AP 114 (or a client station 154) is configured to use multiple primary channels over the operating channel 702 where each primary channel corresponds to its own set of backoff timers (i.e. backoff timers for AC_BE, AC_BK, AC_VI, AC_VO). In the embodiment shown in FIG. 7, the AP 114 designates component channels Ch0 and Ch1 as primary channels over the operating channel 702, corresponding to backoff timers 706 and 716, respectively, and designates component channels Ch2 and Ch3 as secondary channels. In other embodiments, the AP 114 uses additional or fewer primary channels over a different suitable operating channel.

In some embodiments, the AP 114 is configured to set backoff parameters of a primary channel whose backoff timer expires to values according to Enhanced Distributed Control Function Channel Access (EDCA) backoff rules without adjusting the backoff timers of other primary channels. In the embodiment shown in FIG. 7, the AP 114 determines, after expiration of the backoff timer 706-1, that component channels Ch0 and Ch1 of the operating channel 702 are idle. The AP 114 performs a frame exchange that includes a downlink PPDU 720 and an uplink PPDU 722 after the expiration. In an embodiment, after the successful frame exchange, the AP 114 i) sets the backoff parameters that correspond to the backoff timer 706 to values corresponding to the successful frame exchange, for example, by setting the contention window to CWmin, and ii) does not change the backoff parameters that correspond to the backoff timer 716. On the other hand, the AP 114 determines, after expiration of the backoff timer 706-2, that component channels Ch0 and Ch1 of the operating channel 702 are idle and performs a frame exchange that includes a downlink PPDU 750 that has a collision 752 or other frame exchange failure. In an embodiment, after the failed frame exchange, the AP 114 i) sets the backoff parameters that correspond to the backoff timer 706 to values corresponding to an unsuccessful frame exchange, for example, by doubling the contention window and increasing the QLRC, and ii) does not change the backoff parameters that correspond to the backoff timer 716.

In some embodiments, the AP 114 is configured to set backoff parameters of i) a primary channel whose backoff timer expires, and ii) other primary channels, to values according to Enhanced Distributed Control Function Channel Access (EDCA) backoff rules. In an embodiment, after the successful frame exchange, the AP 114 i) sets the backoff parameters that correspond to the backoff timer 706 and backoff timer 716 to values corresponding to the successful frame exchange. In an embodiment, after the failed frame exchange, the AP 114 i) sets the backoff parameters that correspond to the backoff timer 706 and the backoff timer 716 to values corresponding to an unsuccessful frame exchange.

Figure 8:
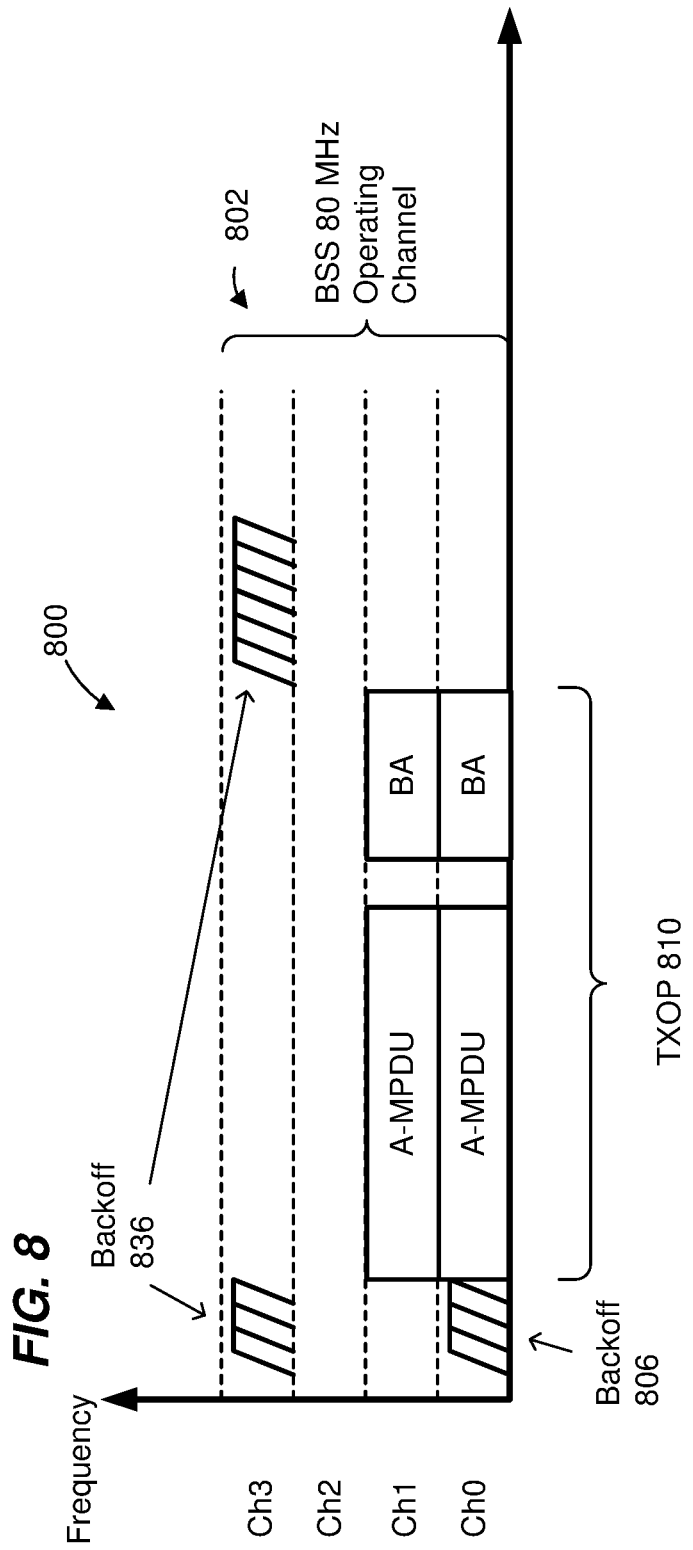
FIG. 8 is an example timing diagram for a WLAN communication device configured to suspend a backoff timer, in an embodiment.

FIG. 8 is an example timing diagram 800 for a WLAN communication device configured to suspend a backoff timer, in an embodiment. In an embodiment, the operating channel 802 corresponds to an operating channel of the AP 114, or of a basic service set (BSS) supported by the AP 114. In an embodiment, the operating channel 802 corresponds to an operating channel of a client station 154 (e.g., the client station 154-1). In other embodiments, the operating channel 802 is employed by a communication device (e.g., an AP or a client station) in a suitable communication network different from the WLAN 110. The operating channel 802 is similar to the operating channel 600 and includes four component channels Ch0, Ch1, Ch2, and Ch3. Although the component channels are shown as being contiguous, in other embodiments, one or more of the component channels are located in different frequency bands and/or are separated by a frequency gap, as described above.

In some embodiments, when a transmission opportunity (TXOP) holder (e.g., the AP 114 or a client station 154) of a TXOP utilizes a portion of the operating channel 802, the AP 114 suspends the backoff timers in other primary channels of the operating channel 802 during the TXOP. In an embodiment, for example, when the AP 114 is not configured to transmit in a first primary channel while simultaneously transmitting in a second primary channel, the AP 114 suspends the backoff timer for the first primary channel while utilizing the second primary channel. In an embodiment, a WLAN communication device announces whether it can receive frames in one band while it is receiving frames in another band. In the embodiment shown in FIG. 8, the backoff timer 806 that corresponds to primary channel Ch0 expires and the AP 114 performs a frame exchange during a TXOP 810. In this embodiment, the AP 114 suspends the backoff timer 836 that corresponds to the primary channel Ch3 during the TXOP 810. The AP 114 resumes the backoff timer 836 when utilization of the component channel Ch0 has completed.

Similarly, in some embodiments, when a TXOP responder (e.g., the AP 114 or a client station 154) utilizes a portion of the operating channel 802, the AP 114 suspends the backoff timers in other primary channels of the operating channel 802 during the TXOP. In an embodiment, for example, when the AP 114 is not configured to transmit in a first primary channel while simultaneously receiving in a second primary channel, the AP 114 suspends the backoff timer for the first primary channel while utilizing the second primary channel. In an embodiment, a WLAN communication device announces whether it can receive frames in one band while it is transmitting frames in another band.

In some embodiments, the AP 114 is configured to determine whether a first component channel and a second component channel are simultaneously usable before suspending a corresponding backoff timer. In some embodiments, for example, the first and second component channels are simultaneously usable when they are located in different bands (i.e., a 2.4 GHz band and a 5 GHz band) and/or handled by different RF radios. In some embodiments, the first and second component channels are not simultaneously usable when they are located in adjacent bands (e.g., 5 GHz band and 6 GHz band).

Figure 9:
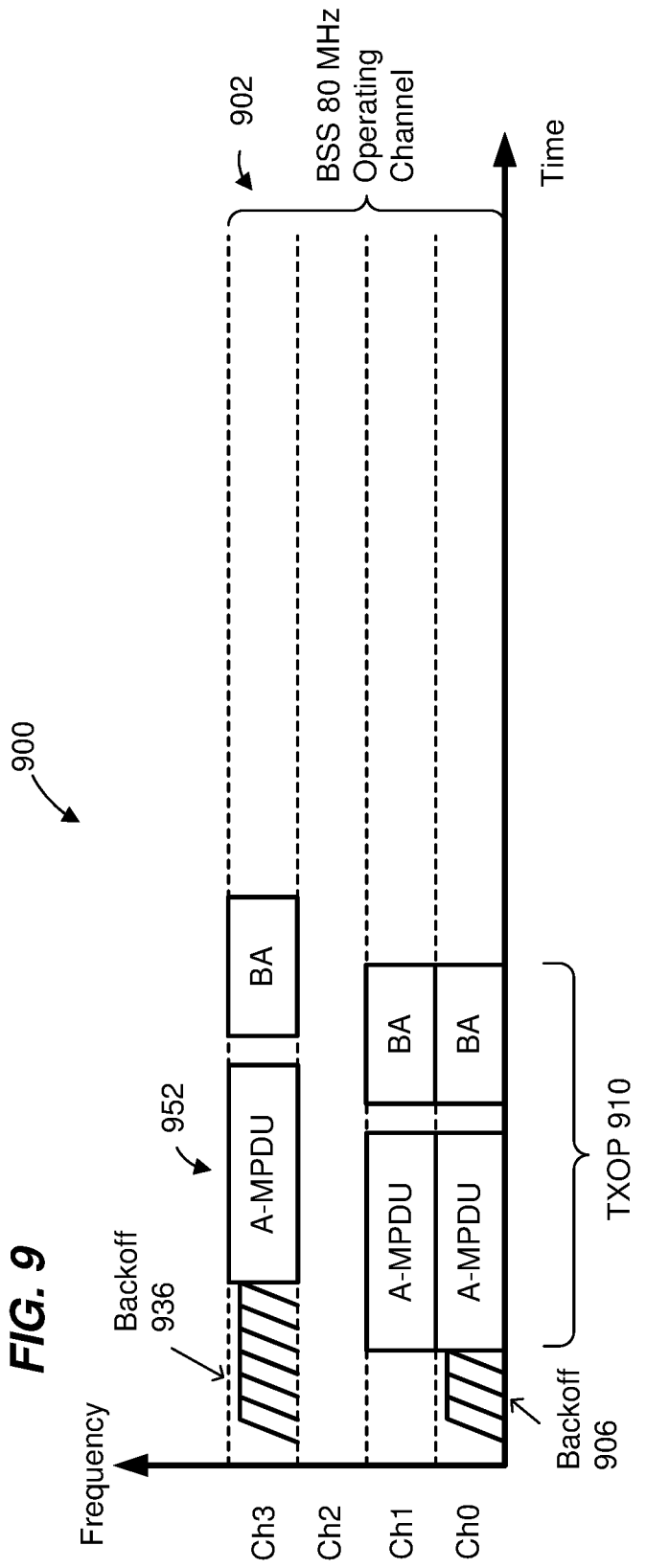
FIG. 9 is an example timing diagram for a WLAN communication device configured to simultaneously utilize multiple primary channels, in an embodiment.

FIG. 9 is an example timing diagram 900 for a WLAN communication device configured to simultaneously utilize multiple primary channels, in an embodiment. In an embodiment, the operating channel 902 corresponds to an operating channel of the AP 114, or of a basic service set (BSS) supported by the AP 114. In an embodiment, the operating channel 902 corresponds to an operating channel of a client station 154 (e.g., the client station 154-1). In other embodiments, the operating channel 902 is employed by a communication device (e.g., an AP or a client station) in a suitable communication network different from the WLAN 110. The operating channel 902 is similar to the operating channel 600 and includes four component channels Ch0, Ch1, Ch2, and Ch3. Although the component channels are shown as being contiguous, in other embodiments, one or more of the component channels are located in different frequency bands and/or are separated by a frequency gap, as described above.

As described above, in some embodiments, the AP 114 (or a client station 154) is able to simultaneously utilize different primary channels, for example, when the primary channels are located in different bands. In the embodiment shown in FIG. 9, the AP 114 is configured to simultaneously utilize primary channels Ch0 and Ch3. In this embodiment, the AP 114 does not suspend the backoff timer 936 that corresponds to the primary channel Ch3 while utilizing the primary channel Ch0 and secondary channel Ch1. In other words, when it is determined that a first component channel and a second component channel are simultaneously usable, the AP 114 utilizes the second component channel asynchronously with the first component channel. In the embodiment shown in FIG. 9, the backoff timer 936 i) is not suspended during a TXOP 910, and ii) expires during the TXOP 910, allowing the AP 114 to perform a transmission 952 during the TXOP 910 using a different primary channel Ch3.

Figure 10:
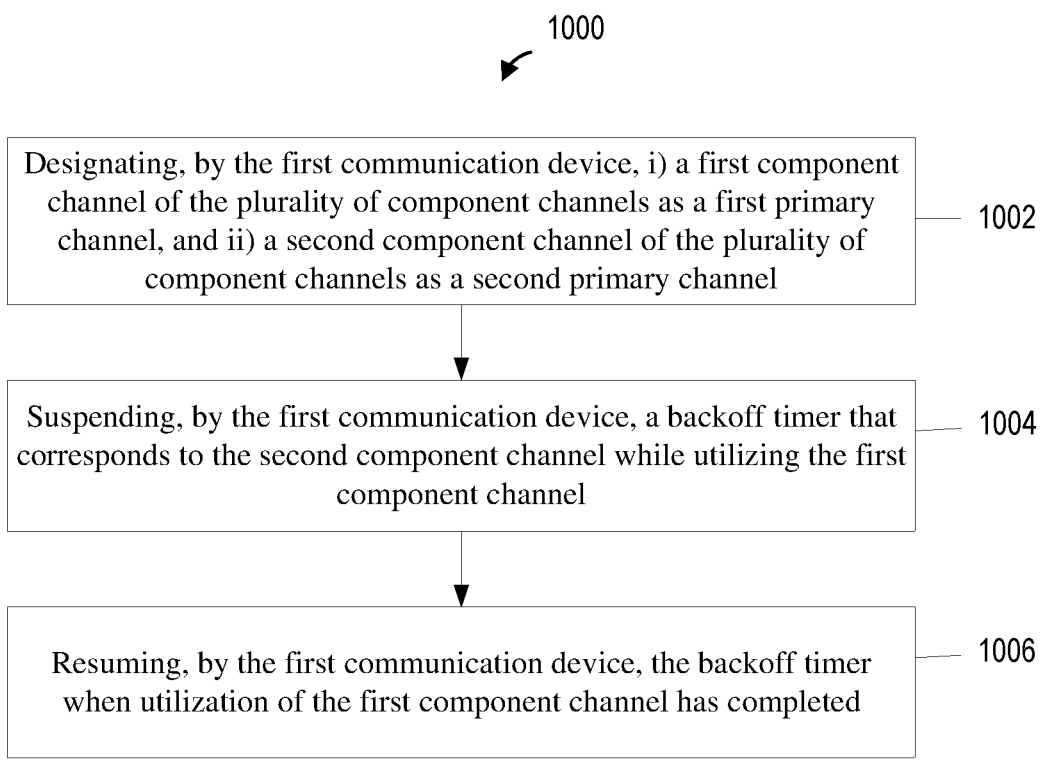
FIG. 10 is a flow diagram illustrating an example method for operation of a first communication device in a WLAN communication channel between the first communication device and one or more second communication devices, according to an embodiment.

FIG. 10 is a flow diagram illustrating an example method 1000 for operation of a first communication device in a WLAN communication channel between the first communication device and one or more second communication devices, according to an embodiment. The WLAN communication channel includes a plurality of component channels, for example, component channels as described above and shown in FIGS. 4A, 4B, 5, 6A, 6B, 7, 8, and 9. In an embodiment, the method 1000 is implemented by a client station in the WLAN, according to an embodiment. With reference to FIG. 1, the method 1000 is implemented by the network interface 162, in an embodiment. For example, in one such embodiment, the PHY processor 170 is configured to implement the method 1000. According to another embodiment, the MAC processor 166 is also configured to implement at least a part of the method 1000. With continued reference to FIG. 1, in yet another embodiment, the method 1000 is implemented by the network interface 122 (e.g., the PHY processor 130 and/or the MAC processor 126). In other embodiments, the method 1000 is implemented by other suitable network interfaces.

At block 1002, the AP 114 designates i) a first component channel of the plurality of component channels as a first primary channel, and ii) a second component channel of the plurality of component channels as a second primary channel. In an embodiment, for example, the AP 114 designates the component channels Ch0 and Ch3 shown in FIG. 8 as primary channels. In an embodiment, the first component channel and the second component channel are non-contiguous. In an embodiment, for example, the first component channel is separated from the second component channel by at least one third component channel. In another embodiment, the first component channel is located in a different band from the second component channel.

In an embodiment, the WLAN communication channel has i) a first radio frequency (RF) channel segment that occupies a first frequency bandwidth and includes at least the first component channel, ii) a second RF channel segment that occupies a second frequency bandwidth and includes at least the second component channel, and the first frequency bandwidth and the second frequency bandwidth do not overlap and are separated by a frequency gap. In an embodiment, for example, the first RF channel segment and the second RF channel segment correspond to the channel segments 410 and 420 as described above with respect to FIGS. 4A and 4B. In an embodiment, the first communication device includes i) a first RF radio configured for operation in the first RF channel segment and not in the second RF channel segment and ii) a second RF radio configured for operation in the second RF channel segment and not the first RF channel segment. In an embodiment, for example, the first RF radio corresponds to the RF radio 328 and the second RF radio corresponds to the RF radio 336.

At block 1004, the AP 114 suspends a backoff timer that corresponds to the second component channel while utilizing the first component channel and without utilizing the second component channel. In an embodiment, for example, the AP 114 suspends the backoff timer 836 without utilizing the component channel Ch3 (FIG. 8). In an embodiment, utilization of the first component channel includes at least one of transmitting or receiving media access layer protocol data units (MPDUs). In an embodiment, for example, the utilization includes transmission of the A-MPDU and reception of the block acknowledgment during the TXOP 810 (FIG. 8).

At block 1006, the AP 114 resumes the backoff timer when utilization of the first component channel has completed. In an embodiment, for example, the AP 114 resumes the backoff timer 836 after the TXOP 810.

Figure 11:
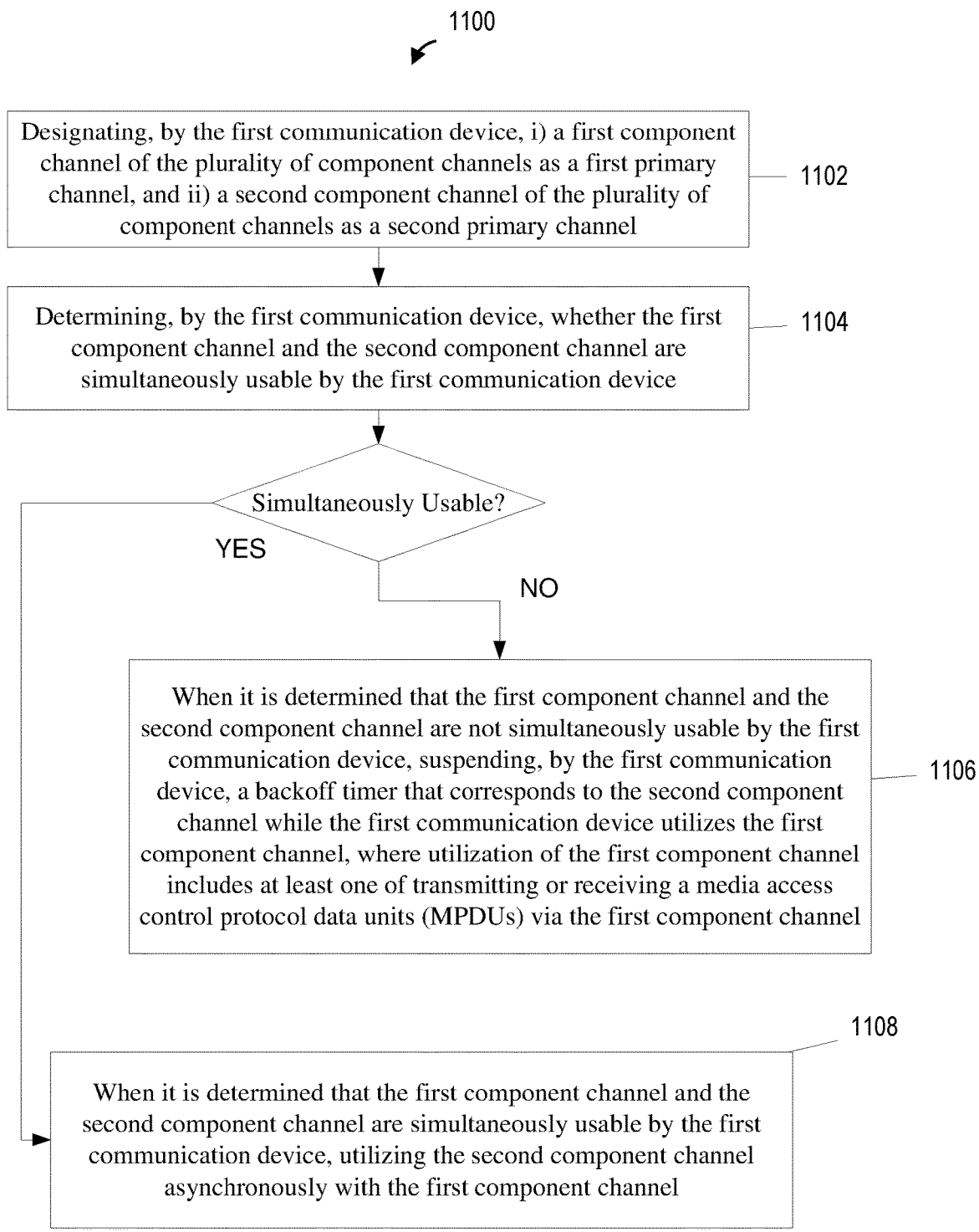
FIG. 11 is a flow diagram illustrating another example method for operation of a first communication device in a WLAN communication channel between the first communication device and one or more second communication devices, according to an embodiment.

FIG. 11 is a flow diagram illustrating an example method 1100 for operation of a first communication device in a WLAN communication channel between the first communication device and one or more second communication devices, according to an embodiment. The WLAN communication channel includes a plurality of component channels, for example, component channels as described above and shown in FIGS. 4A, 4B, 5, 6A, 6B, 7, 8, and 9. In an embodiment, the method 1100 is implemented by a client station in the WLAN, according to an embodiment. With reference to FIG. 1, the method 1100 is implemented by the network interface 162, in an embodiment. For example, in one such embodiment, the PHY processor 170 is configured to implement the method 1100. According to another embodiment, the MAC processor 166 is also configured to implement at least a part of the method 1100. With continued reference to FIG. 1, in yet another embodiment, the method 1100 is implemented by the network interface 122 (e.g., the PHY processor 130 and/or the MAC processor 126). In other embodiments, the method 1100 is implemented by other suitable network interfaces.

At block 1102, the AP 114 designates i) a first component channel of the plurality of component channels as a first primary channel, and ii) a second component channel of the plurality of component channels as a second primary channel. In an embodiment, for example, the AP 114 designates the component channels Ch0 and Ch3 shown in FIG. 8 as primary channels.

At block 1104, the AP 114 determines whether the first component channel and the second component channel are simultaneously usable by the first communication device. In an embodiment, for example, the AP 114 determines whether the first component channel and the second component channel are handled by different RF radios.

At block 1106, when it is determined that the first component channel and the second component channel are not simultaneously usable by the first communication device, the AP 114 suspends a backoff timer that corresponds to the second component channel while the first communication device utilizes the first component channel, where utilization of the first component channel includes at least one of transmitting or receiving a media access control protocol data units (MPDUs) via the first component channel. In an embodiment, for example, the AP 114 suspends the backoff timer 836 without utilizing the component channel Ch3 (FIG. 8). In an embodiment, utilization of the second component channel includes at least one of transmitting or receiving MPDUs via the second component channel.

At block 1108, when it is determined that the first component channel and the second component channel are simultaneously usable by the first communication device, the AP 114 utilizes the second component channel asynchronously with the first component channel.

In an embodiment, the AP 114 resumes the backoff timer when utilization of the first component channel by the first communication device has completed. In an embodiment, for example, the AP 114 resumes the backoff timer 836 after the TXOP 810.

Figure 12:
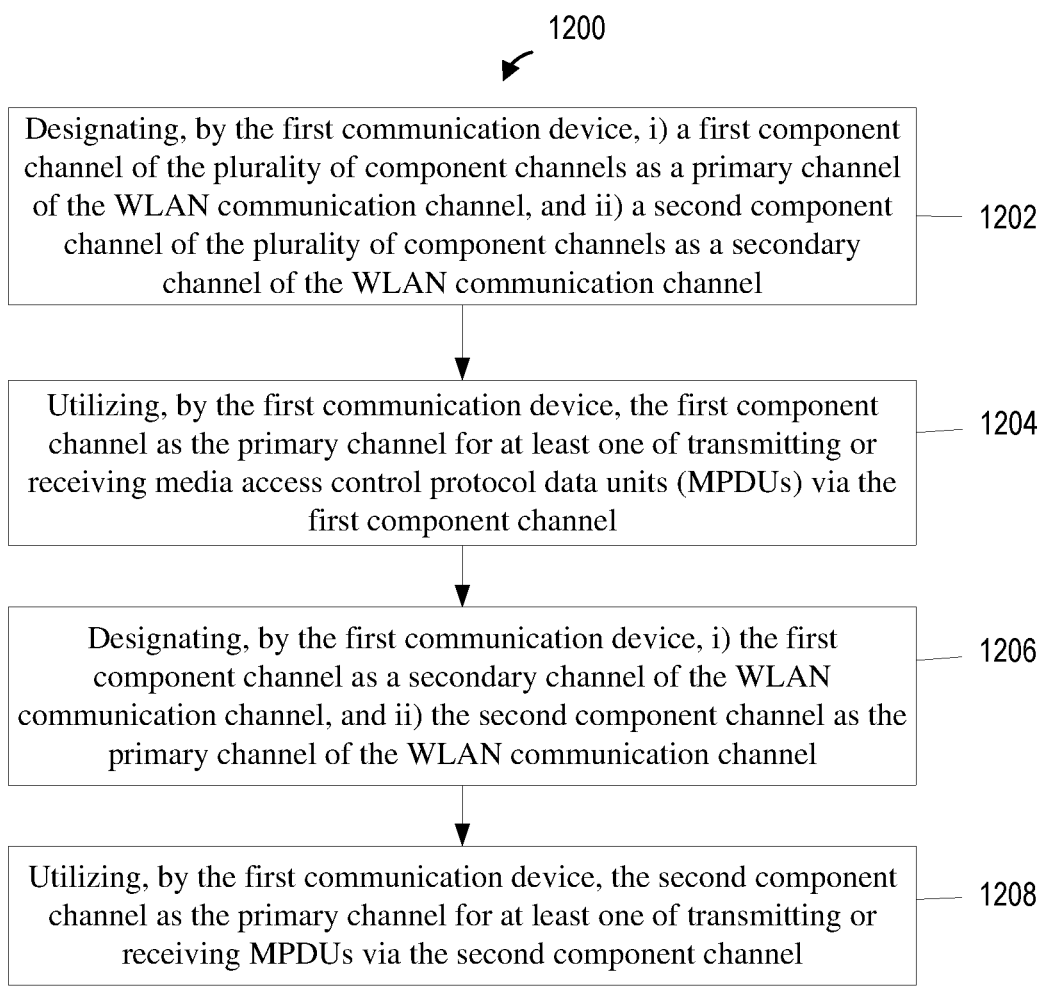
FIG. 12 is a flow diagram illustrating yet another example method for operation of a first communication device in a WLAN communication channel between the first communication device and one or more second communication devices, according to an embodiment.

FIG. 12 is a flow diagram illustrating an example method 1200 for operation of a first communication device in a WLAN communication channel between the first communication device and one or more second communication devices, according to an embodiment. The WLAN communication channel includes a plurality of component channels, for example, component channels as described above and shown in FIGS. 4A, 4B, 5, 6A, 6B, 7, 8, and 9. In an embodiment, the method 1200 is implemented by a client station in the WLAN, according to an embodiment. With reference to FIG. 1, the method 1200 is implemented by the network interface 162, in an embodiment. For example, in one such embodiment, the PHY processor 170 is configured to implement the method 1200. According to another embodiment, the MAC processor 166 is also configured to implement at least a part of the method 1200. With continued reference to FIG. 1, in yet another embodiment, the method 1200 is implemented by the network interface 122 (e.g., the PHY processor 130 and/or the MAC processor 126). In other embodiments, the method 1200 is implemented by other suitable network interfaces.

At block 1202, the AP designates i) a first component channel of the plurality of component channels as a primary channel of the WLAN communication channel, and ii) a second component channel of the plurality of component channels as a secondary channel of the WLAN communication channel. In an embodiment, for example, the AP 114 designates the component channel 412 (FIG. 4) as a primary channel and designates the component channel 424-2 as a secondary channel. In another embodiment, for example, the AP 114 designates the component channel Ch0 (FIG. 5) as a primary channel 512 and designates the component channel Ch3 as a secondary channel 514-1.

At block 1204, the AP 114 utilizes the first component channel as the primary channel for at least one of transmitting or receiving media access control protocol data units (MPDUs) via the first component channel. In an embodiment, for example, the AP 114 transmits the PPDU 517 (FIG. 5).

At block 1206, the AP 114 designates i) the first component channel as a secondary channel of the WLAN communication channel, and ii) the second component channel as the primary channel of the WLAN communication channel.

In an embodiment, for example, the AP 114 designates the component channel Ch0 as a secondary channel 524 and designates the component channel Ch3 as a primary channel 522.

At block 1208, the AP 114 utilizes the second component channel as the primary channel for at least one of transmitting or receiving MPDUs via the second component channel. In an embodiment, for example, the AP 114 transmits the PPDU 527 (FIG. 5).

In an embodiment, the AP 114 starts a network allocation vector (NAV) synchronization timer after designating the second component channel as the primary channel, and starts a backoff timer after expiration of the NAV synchronization timer, where utilizing the second component channel includes before utilizing the second component channel as the primary channel after expiration of the backoff timer. In an embodiment, the AP 114 starts the NAV synchronization timer 515 and starts the backoff timer 516, as described above with respect to FIG. 5.

In an embodiment, the AP 114 receives an MPDU that includes a NAV indication via the second component channel during the NAV synchronization timer and i) stops the NAV synchronization timer, and ii) sets a NAV that corresponds to the second component channel using the NAV indication. In an embodiment, for example, the AP 114 receives the MPDU 521, stops the NAV synchronization timer 525, and sets the backoff timer 526 using the NAV indication of the MPDU 521, as described above with respect to FIG. 5. In an embodiment, the NAV indication is a high efficiency (HE) physical layer (PHY) header that includes a duration field.

In an embodiment, the AP 114 sets one or more backoff parameters that correspond to the backoff timer to respective values that correspond to a successful frame exchange. In another embodiment, the AP sets one or more backoff parameters that correspond to the backoff timer to respective values that correspond to a service period. In yet another embodiment, the AP 114 sets one or more backoff parameters that correspond to the backoff timer to respective values that correspond to the first component channel. In an embodiment, for example, the AP 114 sets the backoff parameters as described above with respect to FIG. 7.

In an embodiment, the AP 114 generates one or more MPDUs that include an explicit indication of the designation of the second component channel as the primary channel. The AP 114 transmits the one or more MPDUs using at least one of the first component channel and the second component channel.

In an embodiment, the AP 114 utilizes the first component channel as the primary channel during a first predetermined time period and utilizes the second component channel as the primary channel during a second predetermined time period that does not overlap with the first predetermined time period. In an embodiment, for example, the AP 114 utilizes the component channel Ch0 as the first primary channel 512 during the service period 510 and utilizes the component channel Ch3 as the second primary channel 522 during the service period 520, as described above with respect to FIG. 5. In an embodiment, the first predetermined time period corresponds to a first service period and the second predetermined time period corresponds to a second service period.

In an embodiment, the WLAN communication channel has i) a first RF channel segment that occupies a first frequency bandwidth and includes at least the first component channel, ii) a second RF channel segment that occupies a second frequency bandwidth and includes at least the second component channel. The first frequency bandwidth and the second frequency bandwidth do not overlap and are separated by a frequency gap. In an embodiment, for example, the first RF channel segment and the second RF channel segment correspond to the channel segments 410 and 420 as described above with respect to FIGS. 4A and 4B.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously transmitting via a plurality of channel segments that includes i) a first channel segment in a first radio frequency (RF) band, and ii) a second channel segment in a second RF band, the method comprising:
    maintaining, at a communication device, a first backoff timer that corresponds to the first channel segment, the first backoff timer for determining when the communication device can transmit via the first channel segment;
    maintaining, at the communication device, a second backoff timer that corresponds to the second channel segment, the second backoff timer for determining when the communication device can transmit via the second channel segment;
    in response to the first backoff timer expiring, waiting, by the communication device, to transmit via the first channel segment until the second backoff timer expires; and
    after waiting to transmit via the first channel segment and in response to the second backoff timer expiring:
        transmitting, by the communication device, via the first channel segment beginning at a start time, and
        transmitting, by the communication device, via the second channel segment beginning at the start time.

2. The method of claim 1, wherein transmitting via the first channel segment and transmitting via the second channel segment comprises:
    simultaneously transmitting with a gap in frequency between the first channel segment and the second channel segment.

3. The method of claim 1, wherein transmitting via the first channel segment and transmitting via the second channel segment comprises:

ending transmission via the first channel segment at an end time; and ending transmission via the second channel segment at the end time.

4. The method of claim 1, wherein transmitting via the first channel segment and transmitting via the second channel segment comprises:

transmitting via the first channel segment with a first RF radio configured for operation in the first RF band; and transmitting via the second channel segment with a second RF radio configured for operation in the second RF band.

5. The method of claim 4, wherein transmitting via the first channel segment and transmitting via the second channel segment further comprises:

generating, by a first baseband signal processor coupled to the first RF radio, a first baseband signal corresponding to a first RF transmission via the first channel segment; and generating, by a second baseband signal processor coupled to the second RF radio, a second baseband signal corresponding to a second RF transmission via the second channel segment.

6. The method of claim 1, wherein:

the first channel segment comprises a first primary channel and one or more first secondary channels;

the second channel segment comprises a second primary channel and one or more second secondary channels;

maintaining the first backoff timer comprises maintaining the first backoff timer to correspond with the first primary channel; and maintaining the second backoff timer comprises maintaining the second backoff timer to correspond with the second primary channel.

7. The method of claim 1, further comprising:

maintaining, at the communication device, a network allocation vector (NAV) timer for monitoring use of a communication medium;

wherein maintaining the first backoff timer comprises starting the first backoff timer in response to the NAV timer expiring.

8. A communication device, comprising:

a wireless network interface device that is configured to communicate simultaneously via a plurality of channel segments having i) a first channel segment in a first radio frequency (RF) band, and ii) a second channel segment in a second RF band, wherein the wireless network interface device comprises:

one or more integrated circuit (IC) devices, a first backoff timer that corresponds to the first channel segment, the first backoff timer implemented on the one or more IC devices, and a second backoff timer that corresponds to the second channel segment, the second backoff timer implemented on the one or more IC devices;

wherein the one or more IC devices are configured to:

maintain the first backoff timer to determine when the communication device can transmit via the first channel segment, maintain the second backoff timer to determine when the communication device can transmit via the second channel segment, in response to the first backoff timer expiring, control the wireless network interface device to wait to transmit via the first channel segment until the second backoff timer expires, and after controlling the wireless network interface device to wait to transmit via the first channel segment and in response to the second backoff timer expiring:

control the wireless network interface device to transmit via the first channel segment beginning at a start time, and control the wireless network interface device to transmit via the second channel segment beginning at the start time.

9. The communication device of claim 8, wherein the one or more IC devices are configured to control the wireless network interface device to, as part of controlling the wireless network interface device to transmit via the first channel segment and to transmit via the second channel segment:

end transmission via the first channel segment at an end time; and end transmission via the second channel segment at the end time.

10. The communication device of claim 8, wherein the wireless network interface device further comprises:

a first RF radio configured for operation in the first RF band; and a second RF radio configured for operation in the second RF band;

wherein the one or more IC devices are configured to, as part of controlling the wireless network interface device to transmit via the first channel segment and to transmit via the second channel segment:

control the first RF radio to transmit via the first channel segment, and control the second RF radio to transmit via the second channel segment.

11. The communication device of claim 10, wherein the first RF radio and the second RF radio are configured to simultaneously transmit via the first channel segment and transmit via the second channel segment with a gap in frequency between the first channel segment and the second channel segment.

12. The communication device of claim 10, wherein the wireless network interface device further comprises:

a first baseband signal processor implemented on the one or more IC devices, the first baseband signal processor coupled to the first RF radio; and a second baseband signal processor implemented on the one or more IC devices, the second baseband signal processor coupled to the second RF radio;

wherein the first baseband signal processor is configured to, as part of the one or more IC devices controlling the wireless network interface to transmit via the first channel segment: generate a first baseband signal corresponding to a first RF transmission via the first channel segment; and wherein the second baseband signal processor is configured to, as part of the one or more IC devices controlling the wireless network interface to transmit via the second channel segment: generate a second baseband signal corresponding to a second RF transmission via the first channel segment.

13. The communication device of claim 12, wherein the wireless network interface device further comprises:

a medium access control (MAC) processor implemented on the one or more IC devices, the MAC processor coupled to the first baseband signal processor and the second baseband signal processor.

14. The communication device of claim 8, wherein:

the first channel segment comprises a first primary channel and one or more first secondary channels;

the second channel segment comprises a second primary channel and one or more second secondary channels; and the one or more IC devices are configured to maintain the first backoff timer to correspond with the first primary channel, and maintain the second backoff timer to correspond with the second primary channel.

15. The communication device of claim 8, wherein:

the wireless network interface device further comprises a network allocation vector (NAV) timer implemented on the one or more IC devices;

the one or more IC devices are further configured to:

maintain the NAV timer to monitor use of a communication medium, and starting the first backoff timer in response to the NAV timer expiring as part of maintaining the first backoff timer.

16. The communication device of claim 8, wherein:

the wireless network interface device further comprises synchronization control circuitry implemented on the one or more IC devices; and the synchronization control circuitry is configured to:

in response to the first backoff timer expiring, control the wireless network interface device to wait to transmit via the first channel segment until the second backoff timer expires, and after controlling the wireless network interface device to wait to transmit via the first channel segment and in response to the second backoff timer expiring:

prompt the wireless network interface device to transmit via the first channel segment beginning at a start time, and prompt the wireless network interface device to transmit via the second channel segment beginning at the start time.

17. The communication device of claim 8, wherein the wireless network interface device further comprises:

a plurality of transceivers configured to simultaneously transmit via the first channel segment and the second channel segment.

18. The communication device of claim 17, further comprising:

a plurality of antennas coupled to the plurality of transceivers.

19. The communication device of claim 8, further comprising:

a host processor coupled to the wireless network interface device.

* * * * *